(12) United States Patent
Lee et al.

(10) Patent No.: US 10,038,174 B2
(45) Date of Patent: Jul. 31, 2018

(54) SEPARATOR AND LITHIUM BATTERY INCLUDING THE SEPARATOR

(71) Applicant: Samsung SDI Co., Ltd., Yongin-si, Gyeonggi-do (KR)

(72) Inventors: Beom-Wook Lee, Yongin-si (KR); Bum-Jin Chang, Yongin-si (KR); Myung-Seop Kim, Yongin-si (KR); Hye-Sun Jeong, Yongin-si (KR); Sam-Jin Park, Yongin-si (KR); Jung-Ock Yeou, Yongin-si (KR); Kwi-Seok Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/252,544

(22) Filed: Apr. 14, 2014

(65) Prior Publication Data
US 2014/0308565 A1 Oct. 16, 2014

(30) Foreign Application Priority Data

Apr. 16, 2013 (KR) .................. 10-2013-0041845
Apr. 16, 2013 (KR) .................. 10-2013-0041846
Feb. 7, 2014 (KR) .................. 10-2014-0014448
Feb. 7, 2014 (KR) .................. 10-2014-0014449

(51) Int. Cl.
*H01M 2/16* (2006.01)
*H01M 4/62* (2006.01)
*H01M 10/052* (2010.01)

(52) U.S. Cl.
CPC ....... *H01M 2/1686* (2013.01); *H01M 2/1646* (2013.01); *H01M 2/1653* (2013.01); *H01M 4/621* (2013.01); *H01M 4/622* (2013.01); *H01M 10/052* (2013.01)

(58) Field of Classification Search
CPC ..... H01M 2/1653; H01M 4/621; H01M 4/622
See application file for complete search history.

(56) References Cited

U.S. PATENT DOCUMENTS

2010/0015530 A1* 1/2010 Katayama ............... H01G 9/02
 429/246
2012/0107667 A1 5/2012 Jeong et al.
2013/0330590 A1* 12/2013 Toyoda ............... H01M 2/1653
 429/142

FOREIGN PATENT DOCUMENTS

KR 10-2012-0044682 A 5/2012
WO WO2012115252 * 8/2012

* cited by examiner

*Primary Examiner* — Ladan Mohaddes
(74) *Attorney, Agent, or Firm* — Knobbe, Martens, Olson & Bear LLP

(57) ABSTRACT

A separator including a porous base material layer and a coating layer disposed on at least one surface of the porous base material layer, wherein the coating layer includes the binder composition, and a binder film comprising the binder composition has an elongation of 10% or less measured after maintaining the binder film under a load of 50 g at 150° C. for 10 minutes, and a lithium battery including the same.

17 Claims, 4 Drawing Sheets

SEPARATOR AND LITHIUM BATTERY INCLUDING THE SEPARATOR

CROSS-REFERENCE TO RELATED APPLICATIONS

This application claims the benefit of Korean Patent Application No. 10-2013-0041845, filed on Apr. 16, 2013, Korean Patent Application No. 10-2013-0041846, filed on Apr. 16, 2013, Korean Patent Application No. 10-2014-0014448, filed on Feb. 7, 2014, and Korean Patent Application No. 10-2014-0014449, filed on Feb. 7, 2014, in the Korean Intellectual Property Office, the disclosures of which are incorporated herein in their entirety by reference.

BACKGROUND

Field

One or more embodiments relate to a separator and a lithium battery including the separator.

Description of the Related Art

To comply with demand for small and high-performance devices, small and light-weight lithium batteries have been manufactured. Also, for use in electric vehicles, discharging capacity, energy density, and cycle characteristics of lithium batteries are taken into consideration as important factors. For use in such appliances, lithium batteries with large discharge capacity and high energy density per unit volume and excellent lifespan characteristics are required.

A lithium battery includes a separator to prevent short-circuiting between a positive electrode and a negative electrode. An organic separator melts at a temperature of 200° C. or less. Thus, when the temperature of a battery including an organic-based separator is increased due to inner and/or external stimuli, a volumetric change may occur due to shrinking or melting of the separator, thereby stopping operation of the battery.

Olefin-based polymers have been widely used as a separator for lithium batteries. Although a separator comprising an olefin-based polymer has excellent flexibility, strength of the separator decreases after being immersed in an electrolytic solution, and short-circuit may occur due to rapid thermal shrinkage at a high temperature of 100° C. or greater.

Thus, there is a need to develop a separator having high stability due to high heat resistance and low thermal shrinkage.

SUMMARY

One or more embodiments includes a separator having high heat resistance and stability.

One or more embodiments includes a lithium battery including the separator.

Additional aspects will be set forth in part in the description which follows and, in part, will be apparent from the description, or may be learned by practice of the presented embodiments.

According to one or more embodiments, a separator includes: a porous base material layer; and a coating layer disposed on at least one surface of the porous base material layer, wherein the coating layer comprises a binder composition, wherein an elongation of a binder film comprising the binder composition measured after maintaining the binder film under a load of about 50 g at about 150° C. for 10 minutes is 10% or less.

According to one or more embodiments, a lithium battery includes the separator.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE PREFERRED EMBODIMENT

Figure 1:
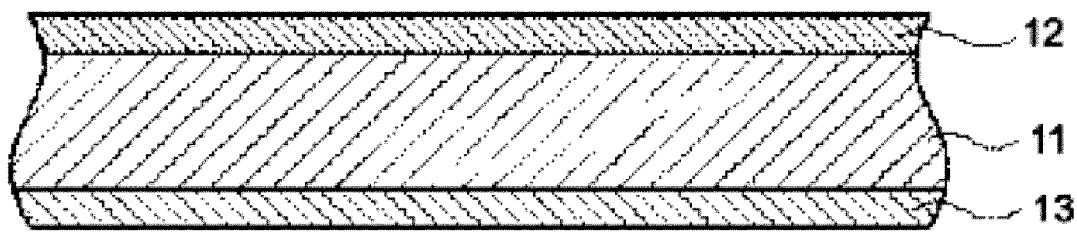
FIG. 1 is a schematic diagram of a separator according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Polyolefin-based separators have excellent flexibility but high thermal shrinkage. As a result of performing research on a method of developing a separator having high flexibility and high heat resistance to allow a battery to have high stability and low thermal shrinkage in consideration that conventional separators having high glass transition temperature (Tg) or high strength have low flexibility, a stable separator is developed. The separator having flexibility and heat resistance may provide high flexibility and inhibit thermal shrinkage in a battery, so that short-circuit may be prevented at a high temperature. The separator is prepared by forming a coating layer on at least one surface of a porous base material layer by using a binder composition, which is prepared such that a binder film comprising the binder composition has first nanoparticles having an average particle diameter of about 100 nm or less and a first polymer binder having a glass transition temperature of about 20° C. or less. The binder composition contained in the coating layer is defined as a state including or not including a solvent.

A separator according to an embodiment includes a porous base material layer and a coating layer disposed on at least one surface of the porous base material layer. The coating layer includes the binder composition, and a binder film comprising the binder composition has an elongation of about 10% or less measured after maintaining the binder film under a load of about 50 g at about 150° C. for 10 minutes. Since the separator has excellent flexibility, and thermal shrinking thereof is inhibited due to improved heat resistance of the film, stability of a battery may be improved.

For example, the separator may have a structure including a porous base material layer 11 and coating layers 12 and 13 disposed on at least one surface of the porous base material layer 11 as illustrated in FIG. 1.

In the separator, an elongation of the binder film comprising the binder composition measured after maintaining the binder film under a load of about 50 g at about 150° C. for 10 minutes may be 10% or less. For example, the elongation of the binder film measured after maintaining the binder film under a load of about 50 g at about 150° C. for 10 minutes may be about 8% or less. For example, the elongation of the binder film measured after maintaining the binder film under a load of about 50 g at about 150° C. for 10 minutes may be about 7% or less. For example, the elongation of the binder film measured after maintaining the binder film under a load of about 50 g at about 150° C. for 10 minutes may be 6.5% or less. For example, the elongation of the binder film measured after maintaining the binder film under a load of about 50 g at about 150° C. for 10 minutes may be greater than 0 to about 10%. For example, the elongation of the binder film measured after maintaining the binder film under a load of about 50 g at about 150° C. for 10 minutes may be about 1% to about 8%. For example, the elongation of the binder film measured after maintaining the binder film under a load of about 50 g at about 150° C. for 10 minutes may be about 2% to about 7%. For example, the elongation of the binder film measured after maintaining the binder film under a load of about 50 g at about 150° C. for 10 minutes may be about 3% to about 6.5%. When the elongation of the binder film measured after maintaining the binder film under a load of about 50 g at about 150° C. for 10 minutes is greater than about 10%, it is difficult to inhibit melting and/or thermal shrinking of the separator at a high temperature. When the elongation of the binder film is too low, it is difficult to wind the separator due to increased hardness, and the separator may crack during a battery manufacturing process. The elongation is a value of dividing an increased length of the separator by an initial length of the separator.

In addition, the separator may include a porous base material layer and a coating layer disposed on at least one surface of the porous base material layer. The coating layer includes the binder composition, and a breaking strength of a binder film comprising the binder composition measured after being immersed in an electrolytic solution may be 40 $Kg/cm^2$ or greater. The separator may have high flexibility and low shrinkage.

In the separator, the binder film comprising the binder composition may have a breaking strength, after being immersed in the electrolytic solution, of about 40 $Kg/cm^2$ or greater. For example, the breaking strength of the binder film comprising the binder composition measured at a tension speed of about 100 cm/min, after the binder film is immersed in a polar non-aqueous solvent at about 70° C. for 72 hours and the electrolytic solution is removed therefrom, may be about 40 $Kg/cm^2$ or greater. For example, the breaking strength of the binder film comprising the binder composition measured after being immersed in the electrolytic solution may be about 50 $Kg/cm^2$ or greater. For example, the breaking strength of the binder film comprising the binder composition measured after being immersed in the electrolytic solution may be about 55 $Kg/cm^2$ or greater. For example, the breaking strength of the binder film comprising the binder composition measured after being immersed in the electrolytic solution may be about 60 $Kg/cm^2$ or greater. For example, the breaking strength of the binder film comprising the binder composition measured after being immersed in the electrolytic solution may be about 65 $Kg/cm^2$ or greater. For example, the breaking strength of the binder film comprising the binder composition measured after being immersed in the electrolytic solution may be about 70 $Kg/cm^2$ or greater. For example, the breaking strength of the binder film comprising the binder composition measured after being immersed in the electrolytic solution may be about 40 $Kg/cm^2$ to about 200 $Kg/cm^2$. For example, the breaking strength of the binder film comprising the binder composition measured after being immersed in the electrolytic solution may be about 50 $Kg/cm^2$ to about 150 $Kg/cm^2$. For example, the breaking strength of the binder film comprising the binder composition measured after being immersed in the electrolytic solution may be about 55 $Kg/cm^2$ to about 150 $Kg/cm^2$. For example, the breaking strength of the binder film comprising the binder composition measured after being immersed in the electrolytic solution may be about 60 $Kg/cm^2$ to about 130 $Kg/cm^2$. When the breaking strength of the binder film after being immersed in the electrolytic solution is less than 40 $Kg/cm^2$, it is difficult to inhibit thermal shrinking of the separator. When the breaking strength of the binder film after being immersed in the electrolytic solution is too high, it is difficult to wind the separator due to increased hardness, and the separator may crack during a battery manufacturing process.

The coating layer disposed on the porous base material layer may further include a filler in the separator. Since the coating layer includes the filler and the binder composition, the binder composition includes nanoparticles having an average particle diameter of 100 nm or less and a polymer binder having a glass transition temperature of about 20° C. or less, and the binder film comprising the binder composition has high heat resistance with an elongation of about 10% or less measured after maintaining the binder film under a load of about 50 g at about 150° C. for 10 minutes, thermal shrinking of the separator may be inhibited, thereby improving stability of a lithium battery. In addition, since the binder film comprising the binder composition and contained in the separator has a high breaking strength of about 40 $Kg/cm^2$ or greater after being immersed in the electrolytic solution, thermal shrinking of the separator may be inhibited, thereby improving stability of the lithium battery. Particularly, in the binder composition contained in the coating layer of the separator, since a first polymer binder includes a functional group capable of bonding to first nanoparticles, the separator may have high modulus at a high temperature of about 60° C. or higher. In the binder composition, the first polymer binder does not have a particular shape and may function as a matrix.

Since the binder composition contained in the separator includes the first nanoparticles and the first polymer binder, strength is improved, thermal shrinking is inhibited, and heat resistance may be improved. For example, the binder composition may have a storage modulus of about 30 MPa or greater at 100° C. For example, the binder composition may have a storage modulus of about 30 MPa to about 150 MPa at 100° C. Since the storage modulus is within the range described above at 100° C., thermal shrinking of the separator including the binder composition may be inhibited at a high temperature, and the separator may have excellent heat resistance. For example, the binder composition may have a storage modulus of about 50 MPa to about 200 MPa at 40° C. When the storage modulus of the binder composition is too high, the separator may crack. Since the storage modulus is within the range described above at 40° C., cracks may be inhibited at room temperature in the separator including the binder composition.

The first nanoparticles of the binder composition contained in the separator may have an average particle diameter of about 1 nm to about 100 nm. For example, the first nanoparticles may have an average particle diameter of about 5 nm to about 100 nm. For example, the first nanoparticles may have an average particle diameter of about 10 nm to about 100 nm. For example, the first nanoparticles may have an average particle diameter of about 20 nm to about 100 nm. For example, the first nanoparticles may have an average particle diameter of about 30 nm to about 100 nm. For example, the first nanoparticles may have an average particle diameter of about 30 nm to about 80 nm. For example, the first nanoparticles may have an average particle diameter of about 40 nm to about 80 nm. For example, the first nanoparticles may have an average particle diameter of about 50 nm to about 80 nm. For example, the first nanoparticles may have an average particle diameter of about 60 nm to about 80 nm. When the average particle diameter of the first nanoparticles is greater than 100 nm, strength of the separator may be reduced. When the average particle diameter is too small, it is difficult to prepare the separator, and the separator may not be easily handled due to a low solid content.

In the binder composition contained in the separator, when the first nanoparticles have a glass transition temperature of 60° C. or higher, heat resistance and/or strength of the separator may be improved.

For example, the glass transition temperature of the first nanoparticles may be greater than 60° C. in the binder composition contained in the separator. For example, the glass transition temperature of the first nanoparticles may be 70° C. or greater in the binder composition. For example, the glass transition temperature of the first nanoparticles may be 80° C. or greater in the binder composition. For example, the glass transition temperature of the first nanoparticles may be 90° C. or greater in the binder composition.

The first nanoparticles having the glass transition temperature of 60° C. or greater may be polymer particles. For example, the first nanoparticles having the glass transition temperature of 60° C. or greater may be polyurethane particles, without being limited thereto. In addition, any polymer particles having the glass transition temperature of 60° C. or greater may also be used.

Alternatively, in the binder composition contained in the separator, the first nanoparticles may not substantially have a glass transition temperature. The "not substantially having a glass transition temperature, indicates that a slope change of a heat flow of the first nanoparticles with respect to temperature obtained using a differential scanning calorimeter (DSC) is negligible, thereby unavailable to measure a significant value.

The first nanoparticles not having a glass transition temperature (Tg) refer to particles that are not flexible and include inorganic particles and polymer particles, which are highly cross-linked not to exhibit a glass transition temperature.

For example, the first nanoparticles not having a glass transition temperature may be cross-linked polymethylmethacrylate. For example, the first nanoparticles not having a glass transition temperature may include particles of at least one selected from the group consisting of colloidal silica ($SiO_2$), α-alumina (α-$Al_2O_3$), γ-alumina (γ-$Al_2O_3$), zirconium oxide ($ZrO_2$), magnesium fluoride ($MgF_2$), titania ($TiO_2$), tin oxide ($SnO_2$), cerium oxide ($CeO_2$), nickel oxide (NiO), calcium oxide (CaO), zinc oxide (ZnO), magnesium oxide (MgO), yttrium oxide ($Y_2O_3$), $SrTiO_3$, $BaTiO_3$, and $Mg(OH)_2$. However, the first nanoparticles not having a glass transition temperature are not limited thereto, and any inorganic particles commonly used in the art may also be used.

The particles having a glass transition temperature of about 60° C. or greater or particles not having glass transition temperature may be used combined with the polymer binder having a glass transition temperature of 20° C. or less in order to inhibit shrinking of the separator. Since batteries are used at a temperature less than 60° C., the particles having a glass transition temperature of 60° C. or greater or particles not having a glass transition temperature may be used.

When the glass transition temperature of the first nanoparticles are less than 60° C., the first nanoparticles soften and decrease in strength at 60° C. under the conditions for using the battery, and thus shrinking of the separator may not be inhibited. Thus, particles that do not soften at a temperature less than 60° C. should be used.

When the organic particles are used as the first nanoparticles, the first nanoparticles may be first polymer particles. In addition, when the binder composition contained in the separator further includes particles of two or more different polymers, the additionally added polymer particles may be called second polymer particles, third polymer particles, and the like.

Since the first polymer binder has a glass transition temperature of 20° C. or less in the binder composition contained in the separator, the separator may also have excellent flexibility and high adhesive force in addition to improved heat resistance and improved strength. For example, the first polymer binder may have a glass transition temperature of about −60° C. to about 20° C. For example, the first polymer binder may have a glass transition temperature of about −55° C. to about 20° C. For example, the first polymer binder may have a glass transition temperature of about −50° C. to about 20° C. For example, the first polymer binder may have a glass transition temperature of about −40° C. to about 20° C. For example, the first polymer binder may have a glass transition temperature of about −30° C. to about 20° C. For example, the first polymer binder may have a glass transition temperature of about −20° C. to about 20° C.

The first nanoparticles may include a polar functional group capable of chemically bonding to the first polymer binder. For example, the first nanoparticles may have a polar functional group on the surface thereof. The polar functional group may be bonded to the polymer binder via various bonds such as a hydrogen bond and a covalent bond. For example, the polar functional group may be a carboxyl group, a hydroxyl group, an amine group, a glycidyl group, and the like. However, the polar functional group is not limited thereto, and any polar functional group capable of bonding to the polymer binder may also be used.

The first polymer binder may include a polar functional group capable of chemically bonding to the first nanoparticles. For example, the first polymer binder may have a polar functional group at one or more portions of a backbone and/or side chains. The polar functional group may be bonded to the first nanoparticles via various bonds such as a hydrogen bond and a covalent bond. The polar functional group may be a carboxyl group, a hydroxyl group, an amine group, a glycidyl group, and the like. However, the polar functional group is not limited thereto, and any polar functional group capable of bonding to the first nanoparticles may also be used.

The first nanoparticles and the first polymer binder may constitute a composite. That is, the composite of the first nanoparticles and the first polymer binder may further include a chemical bond formed through reaction between the polar functional group on the surfaces of the first nanoparticles and the polar functional group of the first polymer binder, in addition to a physical bond such as a van der Waals bond.

The binder composition contained in the separator may further include at least one second nanoparticles having a different glass transition temperature from that of the first nanoparticles or not having a glass transition temperature. For example, the binder composition contained in the separator may include two or more types of nanoparticles having different glass transition temperatures or not having a glass transition temperature. For example, the binder composition contained in the separator may include three or more types of nanoparticles having different glass transition temperatures or not having a glass transition temperature.

The binder composition contained in the separator may further include at least one second polymer binder having a different glass transition temperature from that of the first polymer binder. For example, the binder composition contained in the separator may include two or more types of polymer binders having different glass transition temperatures. For example, the binder composition contained in the separator may include three or more types of polymer binders having different glass transition temperatures.

However, the first polymer binder refers to all polymer binders further including the second polymer binder, and the like, otherwise stated below. This concept is also applied to the first nanoparticles.

The binder composition contained in the separator may include about 7 to about 60 parts by weight of the first nanoparticles in terms of the solid content based on 100 parts by weight of the first polymer binder in terms of the solid content. For example, the binder composition contained in the separator may include about 8 to about 60 parts by weight of the first nanoparticles in terms of the solid content based on 100 parts by weight of the first polymer binder in terms of the solid content. For example, the binder composition contained in the separator may include about 10 to about 60 parts by weight of the first nanoparticles in terms of the solid content based on 100 parts by weight of the first polymer binder in terms of the solid content. For example, the binder composition contained in the separator may include about 10 to about 50 parts by weight of the first nanoparticles in terms of the solid content based on 100 parts by weight of the first polymer binder in terms of the solid content. For example, the binder composition contained in the separator may include about 15 to about 45 parts by weight of the first nanoparticles in terms of the solid content based on 100 parts by weight of the first polymer binder in terms of the solid content. As the content of the first nanoparticles decreases, the shrinkage of the separator may increase. When the amount of the first nanoparticles is too great, the separator may crack.

In general, negative electrodes of lithium batteries include carbonaceous materials in combination with other materials to inhibit influence of a material having high volumetric change during charging and discharging. As the amount of a metallic negative active material increases, a negative electrode may swell, and thus a lithium battery may be exposed to high temperature. Thus, in order to inhibit shrinking of a separator, a first nanoparticles/first polymer binder ratio needs to be increased in the binder composition contained in the separator. In addition, as the amount of a metallic negative active material decreases, the degree of swelling of the negative electrode is relatively low compared to a 100% metallic negative active material. Thus, the first nanoparticles/first polymer binder ratio may be decreased to soften the binder composition contained in the separator, thereby improving flexibility of the separator. In addition, as the glass transition temperature of the first polymer binder increases, hardness of the separator increases. Thus, the first nanoparticles/first polymer binder ratio may be reduced to allow the separator to have flexibility.

In the binder composition contained in the separator, the first nanoparticles may be dispersed in the first polymer binder. The first nanoparticles may be dispersed in a matrix comprising the first polymer binder. The first nanoparticles may separately be dispersed in the first polymer binder. Alternatively, the first nanoparticles may aggregate to form secondary particles, and the secondary particles may be dispersed in the matrix comprising the first polymer binder. The first nanoparticles may uniformly be dispersed in the first polymer binder.

For example, the first nanoparticles may non-uniformly be dispersed in the first polymer binder.

For example, the binder composition contained in the separator may include aggregates of the first polymer binder including at least two types of the first polymer binder. The first nanoparticles may be disposed at an interface between the aggregates of the first polymer binder. For example, the first nanoparticles may be disposed between the aggregates of the first polymer binder.

For example, the first nanoparticles may non-uniformly be disposed at the interface between the aggregates of the first polymer binder.

Alternatively, the first nanoparticles may be disposed at an interface between the first polymer binder and another component of the battery. For example, the first nanoparticles may be disposed at an interface between the first polymer binder and an electrolytic solution. For example, the first nanoparticles may be disposed at an interface between the first polymer binder and an electrode active material. For example, the first nanoparticles may be disposed at an interface between the first polymer binder and a conductive agent. For example, the first nanoparticles may non-uniformly be disposed at the interface with another component of the battery.

For example, the first nanoparticles may be any polymer particles having a glass transition temperature of 60° C. or greater or not having a glass transition temperature and an average particle diameter of 100 nm or less, without being limited thereto. For example, the first nanoparticles may have a water-dispersible functional group. The first nanoparticles may be prepared by various polymerization methods such as emulsion polymerization and solution polymerization, without being limited thereto. In addition, reaction conditions used in these methods may appropriately be adjusted.

For example, the first nanoparticles may include an aqueous dispersion of a (meth)acrylic acid ester; a diene-based latex; and aqueous dispersions of ethylene-acrylate, carboxy-denatured polyethylene, polyurethane, nylon, polyester, and the like; and may be cross-linked by a cross-linking agent.

For example, the first nanoparticles may be an aqueous dispersion of a (meth)acrylic acid ester or a diene-based latex prepared by polymerizing radical polymerizable monomers via emulsion polymerization, suspension polymerization, dispersion polymerization, and the like.

The aqueous dispersion of (meth)acrylic acid ester may be prepared by polymerizing ethylenically unsaturated carboxylic acid ester and any other monomers copolymerizable with the ethylenically unsaturated carboxylic acid ester.

Examples of the ethylenically unsaturated carboxylic acid ester may include: alkyl acrylate ester and substituted alkyl ester such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, isobonyl acrylate, hydroxypropyl acrylate, and lauryl acrylate; alkyl metacrylate ester and substituted alkyl ester such as methyl metacrylate, ethyl metacrylate, propyl metacrylate, isopropyl metacrylate, n-butyl metacrylate, isobutyl metacrylate, n-amyl metacrylate, isoamyl metacrylate, n-hexyl metacrylate, 2-ethyl hexyl metacrylate, hydroxy propyl metacrylate, and lauryl metacrylate; alkyl crotonate ester and substituted alkyl ester such as methyl crotonate, ethyl crotonate, propyl crotonate, butyl crotonate, isobutyl crotonate, n-amyl crotonate, isoamyl crotonate, n-hexyl crotonate, 2-ethylhexyl crotonate, and hydroxypropyl crotonate; an amino group-containing methacrylate ester such as dimethylaminoethyl methacrylate and diethylaminoethyl methacrylate; an alkoxy group-containing methacrylate ester such as methoxy polyethylene glycol monomethacrylate; and unsaturated dicarboxylic acid monoester such as monooctyl malate, monobutyl malate, and monoocyl itaconate, without being limited thereto. In addition, any ethylenically unsaturated carboxylic acid ester may also be used.

The monomers copolymerizable with the ethylenically unsaturated carboxylic acid ester may include: unsaturated carboxylic acids such as acrylic acid, methacrylic acid, itaconic acid, and fumaric acid; esters of carboxylic acid with at least two carbon-carbon double bonds such as diethylene glycol dimethacrylate, diethylene glycol dimethacrylate, and trimethylol propane triacrylate; styrene-based monomers such as styrene, chloro styrene, vinyl toluene, t-butyl styrene, vinyl benzoic acid, methylvinyl benzoic acid, vinyl naphthalene, chloromethyl styrene, hydroxy methyl styrene, α-methyl styrene, and divinyl benzene; amide-based monomers such as acrylamide, N-methylol acrylamide, and acrylamide-2-methyl propane sulfonic acid; α,β-unsaturated nitrile compounds such as acrylonitrile and methacrylonitrile; olefins such as ethylene and propylene; halogen atom-containing monomers such as vinyl chloride and vinylidene chloride; vinyl esters such as vinyl acetate, vinyl propionate, vinyl butyrate, and vinyl bezoinate; vinyl ethers such as allyl glycidyl ether, methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and hetero ring-containing vinyl compounds such as N-vinyl pyrrolidone, vinyl pyridine, and vinyl imidazole. However, the present embodiment is not limited thereto, and any monomers copolymerizable with the ethylenically unsaturated carboxylic acid ester may also be used.

Among these monomers copolymerizable with the ethylenically unsaturated carboxylic acid ester, at least one of the esters of carboxylic acid with at least two carbon-carbon double bonds, amide-based monomers, α,β-unsaturated nitrile compounds, and vinyl ethers may be used.

The diene-based latex is a copolymer obtained from an aromatic vinyl unit, a conjugated diene unit, an ethylenically unsaturated carboxylic acid ester unit, and an ethylenically unsaturated carboxylic acid unit.

The aromatic vinyl unit may be styrene, α-methyl styrene, p-methyl styrene, vinyl toluene, chloro styrene, or divinyl benzene, for example, styrene.

The conjugated diene unit may be 1,3-butadiene, isoprene, 2-chloro-1,3-butadiene, or chloroprene, for example, 1,3-butadiene.

The ethylenically unsaturated carboxylic acid ester unit may be an ester of (meth)acrylic acid such as methyl methacrylate, ethyl methacrylate, n-propyl methacrylate, propyl methacrylate, n-butyl methacrylate, i-butyl methacrylate, n-amyl methacrylate, i-amyl methacrylate, hexyl methacrylate, 2-hexyl methacrylate, octyl methacrylate, i-nonyl methacrylate, decyl methacrylate, hydroxylmethyl methacrylate, hydroxyethyl methacrylate, and ethylene glycol methacrylate. For example, methyl methacrylate or butyl methacrylate may be used. For example, methyl methacrylate may be used.

The ethylenically unsaturated carboxylic acid unit may be acrylic acid, (meth)acrylic acid, itaconic acid, fumaric acid, maleic acid, and the like.

The first nanoparticles may include a compound unit having another polar functional group and copolymerizable with the aforementioned monomers. The polar functional group-containing compound unit may include: alkylamides of ethylenically unsaturated carboxylic acid such as (meth)acryl amide and N-methylol acryl amide; vinyl esters of carboxylic acid such as vinyl acetate and vinyl propionate; acid anhydrides, monoalkyl esters, and monoamides of ethylenically unsaturated dicarboxylic acid; aminoalkyl esters of ethylenically unsaturated carboxylic acid such as aminoethyl acrylate, dimethylaminoethyl acrylate, and butylaminoethyl acrylate; aminoalkyl amides of ethylenically unsaturated carboxylic acid such as aminoethylacrylamide, dimethylaminomethyl methacrylamide, and methylaminopropyl methacrylamide; vinyl cyanide monomers such as (meth)acrylonitrile and α-chloro acrylonitrile; and unsaturated aliphatic glycidyl ester such as glycidyl methacrylate, without being limited thereto. In addition, any polar functional group-containing compound may also be used.

The monomers should include a polar functional group required to be chemically bonded to the first polymer binder. The polar functional group may be any polar functional group chemically bonded to the first polymer binder or any polar functional group binding the first nanoparticles with the first polar binder using a binding agent. For example, the polar functional group-containing monomer may include an —OH group-containing monomer, a carboxyl group-containing monomer, a glycidyl group-containing monomer, and an amino group-containing monomer, without being limited thereto. In addition, any monomer including polar functional group commonly used in the art may also be used.

The first nanoparticles in a state of being immersed in the electrolytic solution may not swell. For example, the degree of swelling of the first nanoparticles with respect to the electrolytic solution may be about 4 times or less, when the first nanoparticles are immersed in the electrolytic solution. For example, the degree of swelling of the first nanoparticles with respect to the electrolytic solution may be about 3 times or less. For example, the degree of swelling of the first nanoparticles with respect to the electrolytic solution may be about twice or less. As the degree of swelling of the first nanoparticles with respect to the electrolytic solution increases, the glass transition temperature (Tg) of the first nanoparticles may be reduced to 60° C. or less. Thus, when operating temperature of battery increases, it becomes more difficult to inhibit thermal shrinking of the separator in the battery.

In order to inhibit swelling of the first nanoparticles in the electrolytic solution, a diene-based latex in which an amount of styrene and butadiene is used 80% by weight or more based on the amount of the total monomers may be used. When an aqueous dispersion of acrylic acid ester is used, a polymer including 80% by weight or more, for example, 85% by weight or more, of the ethylenically unsaturated carboxylic acid ester, which is esterified with high alcohol having 6 or more carbon atoms, and styrene may be used. In addition, a cross-linked structure may be introduced into the first nanoparticles using a bifunctional monomer having at least two carbon-carbon double bonds. The bifunctional monomer having at least two carbon-carbon double bonds may be carboxylic acid ester having at least two carbon-carbon double bonds such as 2-vinyl benzene, ethylene glycol dimethacrylate, diethylene glycol dimethacrylate, and trimethylolpropane triacrylate. For example, 2-vinyl benzene capable of obtaining hard particles may be used.

In addition, for example, the first nanoparticles may include at least one selected from the group consisting of polyethylene, polypropylene, ethylene-propylene copolymer, polyvinyl chloride, polyvinylidene chloride, polystyrene, polyacrylonitrile, polytetrafluoroethylene, polymethyl methacrylate, polyvinylacetate, polyisoprene, polychloroprene, polyester, polycarbonate, polyamide, polyacrylate, polymethyl methacrylate, polyurethane, acrylonitrile-butadiene-styrene copolymer, polyoxyethylene, polyoxymethylene, polyoxypropylene, styrene-acrylonitrile copolymer, acrylonitrile-styrene-acrylate copolymer, styrene-butadiene copolymer, acrylate-styrene-butadiene copolymer, acrylonitrile-butadiene copolymer, acrylonitrile-butadiene-styrene copolymer, acrylic elastomer, butyl rubber, fluoro elastomer, polyvinylpyrrolidone, polyepichlorohydrine, polyphosphazene, ethylenepropylenediene copolymer, polyvinylpyridine, chlorosulfonated polyethylene, polysulfone, polyvinyl alcohol, polyvinyl acetate, thermoplastic polyester rubber (PTEE), carboxylmethylcellulose, hydroxypropylmethylcellulose, hydroxypropylcellulose, and diacetylcellulose, without being limited thereto. Any polymer particles may also be used. In addition, the first nanoparticles may be cross-linked polymer particles.

The first nanoparticles may be aqueous or non-aqueous polymer particles. The aqueous polymer particles refer to water dispersible polymer particles that is easily dispersed or dissolved in water. The non-aqueous polymer particles are particles not dispersed nor dissolved in water.

For example, the first nanoparticles may be an aqueous dispersion of (meth)acrylic acid ester, a diene-based latex, or aqueous dispersions of polyurethane, nylon, or polyester. Monomers used to prepare the first nanoparticles may include: ethylenically unsaturated alkyl esters of carboxylic acid such as methyl acrylate, ethyl acrylate, butyl acrylate, 2-ethylhexyl acrylate, methyl methacrylate, butyl methacrylate, ethyl methacrylate, and 2-ethylhexyl methacrylate; a cyano group-containing ethylenically unsaturated monomers such as acrylonitrile, methacrylonitrile, α-chloroacrylonitrile, and α-cyanoethyl acrylonitrile; conjugated diene monomers such as 1,3-butadiene, isoprene, 2,3-dimethyl-1,3-butadiene, 2-ethyl-1,3-butadiene, and 1,3-pentadiene, and chloroprene; ethylenically unsaturated carboxylic acids and salts thereof such as acrylic acid, (meth)acrylic acid, maleic acid, fumaric acid, and citraconic acid; aromatic vinyl monomers such as styrene, alkyl styrene, and vinyl naphthalene; fluoroalkyl vinyl ether such as fluoroethyl vinyl ether; vinyl pyridine; non-conjugated diene monomers such as vinyl norbornene, dicyclopentadiene, and 1,4-hexadiene; α-olefins such as ethylene and propylene; ethylenically unsaturated amide monomers such as (meth)acrylamide; isocyanate-based monomers such as methylenediphenyldiisocyanate and toluenediisocyanate; and polyol-based monomers such as glycerin, ethylene glycol, and propylene glycol, without being limited thereto. In addition, any monomers may also be used.

The first nanoparticles may be prepared by various polymerization methods such as emulsion polymerization, solution polymerization, suspension polymerization, and dispersion polymerization, without being limited thereto. In addition, reaction conditions used in these methods may be appropriately adjusted.

In addition, the first nanoparticles may be prepared using a method including dissolving polymer particles having a Tg of 60° C. or higher in a solvent and emulsifying the solution, a method including precipitating polymer in a particle shape by dissolving a crystal polymer in a poor solvent over a melting point while heating and cooling the polymer, and a method including preparing a polymer having a dissociating functional group in an alkaline solution.

The first polymer binder is added to provide flexibility to the separator and obtain adhesive properties with the porous base material layer and the electrodes. Any polymer binder having a glass transition temperature 20° C. or less may be used without limitation. For example, the first polymer binder may have a water-dispersible functional group. The first polymer binder may be prepared by various polymerization methods such as emulsion polymerization and solution polymerization, without being limited thereto. In addition, reaction conditions used in these methods may be appropriately adjusted. The first polymer binder may be an elastomer. For example, monomers used to prepare the first polymer binder are monomers available for radical polymerization. Monomers used to prepare the first polymer binder may be used in combinations of the monomers used to prepare the first nanoparticles described above.

The monomers used to prepare the first polymer binder should include a polar functional group to be chemically bonded to the first nanoparticles. The polar functional group may be any polar functional group chemically bonded to the first nanoparticles or any polar functional group binding the first nanoparticles with the first polar binder using a binding agent. For example, the polar functional group-containing monomer may be an —OH group-containing monomer, a carboxyl group-containing monomer, a glycidyl group-containing monomer, and an amino group-containing monomer, without being limited thereto. In addition, any monomer including a polar functional group commonly used in the art may also be used.

The first polymer binder in a state of being immersed in the electrolytic solution may not swell. For example, the degree of swelling of the first polymer binder with respect to the electrolytic solution may be about 4 times or less, when the first polymer binder is immersed in the electrolytic solution. For example, the degree of swelling of the first polymer binder with respect to the electrolytic solution may be about 3 times or less. For example, the degree of swelling of the first polymer binder with respect to the electrolytic solution may be about twice or less. When the degree of swelling of the first polymer binder with respect to the electrolytic solution is too high, strength of the polymer binder decreases. Accordingly, it is difficult to inhibit shrinking of the separator including a binder composition for a secondary battery.

The degree of swelling is obtained from a weight ratio of the first polymer binder before and after being immersed in the electrolytic solution. That is, the degree of swelling indicates the degree of absorbing the electrolytic solution by the first polymer binder.

In order to inhibit swelling of the polymer binder with respect to the electrolytic solution, a diene-based latex in which the amount of styrene and butadiene is 80% by weight or more based on the amount of the total monomers may be used. When an aqueous dispersion of acrylic acid ester is used, a polymer including 80% by weight or more, for example, 85% by weight or more, of the ethylenically unsaturated carboxylic acid ester that is esterified with high alcohol having 6 or more carbon atoms, and styrene may be used. In addition, the first polymer binder may include at least one selected from the group consisting of styrene-butadiene rubber, acrylate styrene-butadiene rubber, acrylonitrile-butadiene rubber, acrylonitrile-butadiene-styrene rubber, acrylic elastomer, butyl rubber, fluoro elastomer, polytetrafluoroethylene, polyethylene, polypropylene, ethylene-propylene copolymer, polyethylene oxide, polyvinylpyrrolidone, polyepichlorohydrine, polyphosphazene, polyacrylate, polyacrylonitrile, polystyrene, ethylenepropylenediene copolymer, polyvinylpyridine, chlorosulfonated polyethylene, latex, polyester resin, acrylic resins, phenol resins, epoxy resins, polyvinyl alcohol, carboxy methyl cellulose, hydroxypropylmethyl cellulose, hydroxypropyl cellulose, and diacetyl cellulose. However, the first polymer binder is not limited thereto, and any polymer binder commonly used in the art may also be used.

However, although polyvinylidene fluoride (PVDF) has high strength, a separator including PVDF as a binder may crack due to too high hardness thereof.

The first polymer binder may be aqueous or non-aqueous polymer binder. The aqueous polymer binder refers to a water dispersible polymer binder that is easily dispersed or dissolved in water.

The monomers used to prepare the first polymer binder may include: ethylenically unsaturated alkyl esters of carboxylic acid such as methyl methacrylate, butyl methacrylate, ethyl methacrylate, and 2-ethylhexyl methacrylate; a cyano group-containing ethylenically unsaturated monomers such as acrylonitrile, methacrylonitrile, α-chloroacrylonitrile, and α-cyanoethyl acrylonitrile; conjugated diene monomers such as 1,3-butadiene, isoprene, 2,3-dimethyl-1,3-butadiene, 2-ethyl-1,3-butadiene, and 1,3-pentadiene, and chloroprene; ethylenically unsaturated carboxylic acids and salts thereof such as acrylic acid, (meth)acrylic acid, maleic acid, fumaric acid, and citraconic acid; aromatic vinyl monomers such as styrene, alkyl styrene, and vinyl naphthalene; fluoroalkyl vinyl ether such as fluoroethyl vinyl ether; vinyl pyridine; non-conjugated diene monomers such as vinyl norbornene, dicyclopentadiene, and 1,4-hexadiene; α-olefins such as ethylene and propylene; and ethylenically unsaturated amide monomers such as (meth)acrylamide, without being limited thereto. In addition, any monomers may also be used.

The first polymer binder may be prepared by various polymerization methods such as emulsion polymerization and solution polymerization, without being limited thereto. In addition, reaction conditions used in these methods may appropriately be adjusted.

In the binder composition for secondary batteries, a gel content of the first polymer binder may be about 90% or less. Since shrinking of the separator is inhibited by combining the first polymer binder, which includes the polar functional group capable of chemically binding to the first nanoparticle in the binder composition for secondary batteries, with the first nanoparticles, the first polymer binder may have high mobility until it is chemically combined with the first nanoparticles to facilitate combination therebetween.

Thus, when the first polymer binder is a diene-based latex, a gel content may be 90% or less. For example, when the first polymer binder is a diene-based latex, a gel content may be 80% or less. For example, when the first polymer binder is a diene-based latex, a gel content may be 75% or less.

In addition, when the first polymer binder is an emulsion of an acrylic acid ester, a cross-linking structure is introduced into the first polymer binder, and thus, an amount of the bifunctional monomer may be reduced. For example, the amount of the bifunctional monomer may be 1% by weight or less, for example, 0.5% by weight or less, based on the total weight of the monomers. The bifunctional monomer has at least two carbon-carbon double bonds in a single molecule, and examples of the bifunctional monomer may include 2-vinyl benzene or carboxylic acid ester having at least two carbon-carbon double bonds such as ethylene glycol dimethacrylate, diethylene glycol dimethacrylate, and trimethylol propane triacrylate.

For example, the first polymer binder may be prepared by generally available emulsion polymerization, suspension polymerization, and dispersion polymerization.

In this regard, any emulsifier or dispersant commonly used in the emulsion polymerization, suspension polymerization, and dispersion polymerization may be used herein. For example, the emulsifier may be a nonionic emulsifier including: benzene sulfonate such as sodium dodecyl benzene sulfonate and sodium dodecyl phenyl ether sulfonate; alkyl sulfate such as sodium lauryl sulfate and sodium tetradecyl sulfate; sulfosuccinate such as sodium dioctyl sulfosuccinate and sodium dihexyl sulfosuccinate; fatty acid salt such as sodium laurylate; ethoxy sulfate such as polyoxyethylene lauryl ether sulfate sodium salt and polyoxyethylene nonylphenyl ether sulfate sodium salt; alkane sulfonate; sodium salt of alkyl ether phosphate ester; and polyoxyethylene nonyl phenyl ether, polyoxyethylene sorbitan lauryl ester, or polyoxyethylene-polyoxypropylene block copolymer. The emulsifier may be used alone or in combination of at least two thereof. The amount of the emulsifier or the dispersant may be about 0.01 parts by weight to about 10 parts by weight based on 100 parts by weight of the total amount of the monomers. Depending on the polymerization conditions, the emulsifier or the dispersant may not be used.

In case of diene-based latex, a molecular weight modifier such as mercaptans such as t-dodecyl mercaptan, n-dodecyl mercaptan, and n-octyl mercaptan; halogenated hydrocarbons such as carbon tetrachloride and carbon tetrabromide; terpinolene; and α-methyl styrene dimer; may be used.

The molecular weight modifier may be added before initiating polymerization or during the polymerization. The molecular weight modifier may be used in an amount of about 0.01 parts by weight to about 10 parts by weight for example, about 0.1 parts by weight to about 5 parts by weight, based on 100 parts by weight of the monomers.

Since molecular weights may be adjusted according to a polymerization temperature, a monomer-adding rate, and the like in the aqueous dispersion of acrylic acid ester, the molecular weight modifier may not be used.

Any polymerization initiator commonly used in the art for emulsion polymerization, dispersion polymerization, suspension polymerization, and the like may be used herein. For example, examples of the polymerization initiator may include: persulfate such as potassium persulfate and ammonium persulfate; hydrogen peroxide; and organic peroxide such as benzoyl peroxide and cumene hydroperoxide. The polymerization initiator may be used alone or together with a redox polymerization initiator combined with a reductant such as sodium sulfite, sodium thiosulfate, and ascorbic acid. In addition, examples of the polymerization initiator may include: azo compounds such as 2,2'-azobisisobutyronitrile (AIBN), 2,2'-azobis(2,4-dimethylvaleronitrile), 2,2'-azobis(4-methoxy-2,4-dimethylvaleronitrile), dimethyl-2,2'-azobisisobutylate, and 4,4'-azobis(4-cyanopentanoic acid); and amidine compounds such as 2,2'-azobis(2-amino-di-propane)dihydrochloride, 2,2'-azobis(N,N'-dimethyleneisobutylamidine), and 2,2'-azobis(N,N'-dimethyleneisobutylamidine)dihydrochloride. The polymerization initiator may be used alone or in combination of at least two thereof. The amount of the polymerization initiator may be in the range of about 0.01 to about 10 parts by weight, for example 0.1 to about 10 parts by weight, for example, 0.1 to about 5 parts by weight, based on 100 parts by weight of the total weight of the monomers.

The binder composition contained in the separator may selectively include an anti-aging agent, a preservative, an anti-foaming agent, and the like.

The binder composition contained in the separator may further include a binding agent. The binding agent may react with the polar functional group contained in the first nanoparticles and/or the first polymer binder, thereby constituting a covalent bond. For example, binding force between the first nanoparticles and the first polymer binder may be improved by using the binding agent. In the binder composition contained in the separator, the binding agent may exist in the form of a reaction resultant with the first nanoparticles and/or the first polymer binder. The binding agent may be any binding agent capable of cross-linking the first nanoparticles having a glass transition temperature of 60° C. or greater with the first binder polymer having a glass transition temperature of 60° C. or less and reactive with reactive functional groups introduced into the first nanoparticles and the first polymer binder.

The binding agent may include a functional group having reactivity with the polar functional group. For example, the binding agent may include a functional group having reactivity with a carboxyl group. For example, the binding agent may include a functional group having reactivity with a hydroxyl group. For example, the binding agent may include a functional group having reactivity with an amine group. For example, the binding agent may include a functional group having reactivity with water.

For example, the binding agent may be a carbodiimide-based compound. Examples of the binding agent may include N,N'-di-o-tolylcarbodiimide, N,N'-diphenylcarbodiimide, N,N'-dioctyldecylcarbodiimide, N,N'-di-2,6-dikenylphenylcarbodiimide, N-tolyl-N'cyclohexylcarbodiimide, N,N'-di-2,6-diisopropylphenylcarbodiimide, N,N'-di-2,6-di-tertiary-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide, p-phenylene-bis-di-o-tolylcarbodiimide, p-phenylene-bisdi-cyclohexylcarbodiimide, hexamethylene-bisdicyclohexyl-carbodiimide, ethylene-bisdiphenylcarbodiimide, benzene-2,4-diisocyanator-1,3,5-tris(1-methylethyl) homopolymer, a copolymer of 2,4-diisocyanato-1,3,5-tris(1-methylethyl) and 2,6-diisopropyl diisocyanate, and any combination thereof, without being limited thereto. Any carbodiimide-based compound commonly used in the art may also be used. The carbodiimide-based compound in the binding agent may exist in the reaction resultant with the first nanoparticles and/or the first polymer binder. For example, the diimide bond of the carbodiimide-based compound may react with the polar functional group on the surface of the first nanoparticles to form a reaction resultant in which a new covalent is formed.

For example, the binding agent may be a silane coupling agent that is a silane compound.

For example, the silane coupling agent may include at least one selected from the group consisting of an alkoxy group, a halogen atom, an amino group, a vinyl group, a glycidoxy group, an acyloxy group, and a hydroxyl group.

For example, the silane coupling agent may include at least one selected from the group consisting of vinylalkyl-alkoxysilane, epoxyalkylalkoxysilane, mercaptoalkylalkoxysilane, vinylhalosilane, and alkylacyloxysilane.

Examples of the silane coupling agent may include vinyltris(β-methoxyethoxy)silane, γ-methacryloxypropyltrimethoxysilane, γ-glycidoxypropyltrimethoxysilane, β-(3,4-epoxycylohexyl)ethyltrimethoxysilane, γ-glycidoxypropylmethyldiethoxysilane, γ-aminopropyltriethoxysilane, γ-mercaptopropyltrimethoxysilane, γ-chloropropyltrimethoxysilane, vinyltrichlorosilane, and methyltriacetoxysilane, without being limited thereto. In addition, any silane coupling agent commonly used in the art may also be used.

For example, the silane coupling agent may be a silane compound, a hydrazine compound, isocyanate compound, a melamine-based compound, a urea compound, an epoxy compound, a carbodiimide compound, and an oxazoline compound, without being limited thereto. In addition, any binding agent commonly used in the art may also be used. These compounds may be used alone or in combination thereof.

In particularly, a silane compound, an oxazoline compound, a carbodiimide compound, an epoxy compound, and an isocyanate compound may be used.

Alternatively, any other binding agents having self-cross-linking ability or having multiple ligands may also be used.

In addition, commercially available binding agents may also be used.

As the hydrazine compound, APA series (APA-M950, APA-M980, APA-P250, and APA-P280) from Otsuka Chemical Co., Ltd., and the like may be used.

As the isocyanate compound, BASONAT PLR 8878 and BASONAT HW-100 from BASF Corporation and Bayhydur 3100 and Bayhydur VPLS2150/1 from Sumitomo Chemical, and the like may be used.

As the melamine-based compound, Cymel 325 from Mitsui Cytec, Ltd., and the like may be used.

As the urea compound, Bechamine series from DIC Corporation, and the like may be used.

As the epoxy compound, EM-150, EM-101 from Nagase chemteX Corporation, EM-0517, EM-0526, EM-051R, EM-11-50B from ADEKA Corporation, and the like may be used.

As the carbodiimide compound, CARBODILITE series (SV-02, V-02, V-02-L2, V-04, E-01, E-02, V-01, V-03, V-07, V-09, and V-05 from Nisshinbo Chemical Inc., and the like may be used.

As the oxazoline compound, Epocross series (WS-500, WS-700, K-1010E, K-1020E, K-1030E, K-2010E, K-2020E, and K-2030E) from NIPPON SHOKUBAI CO., LTD, and the like may be used.

These are commercially available dispersions or solutions including the binding agent.

For example, an amount of the binding agent contained in the binder of the separator may be 10% by weight or less based on the total weight of the reactants on a dry weight basis. For example, an amount of the binding agent used to prepare the binder may be 5% by weight or less based on the total weight of the reactants on a dry weight basis. For example, the amount of the binding agent used to prepare the binder may be 3% by weight or less based on the total weight of the reactants on a dry weight basis. For example, the amount of the binding agent used to prepare the binder may be greater than 0 and 3% by weight or less based on the total weight of the reactants on a dry weight basis. When the amount of the binding agent is too low, the polar functional group required to stabilize particles may not be sufficient. When the amount of the binding agent is too high, it is difficult to prepare a stable electrode slurry.

The amount of the binder composition prepared by combining the first nanoparticles having a glass transition temperature of 60° C. or greater and the first polymer binder having a glass transition temperature of 20° C. or less may be about 01% by weight to about 50% by weight based on the total weight of the coating layer contained in the separator. For example, the amount of the binder composition may be about 1% by weight to about 50% by weight based on the total weight of the coating layer. For example, the amount of the binder composition may be about 1% by weight to about 40% by weight based on the total weight of the coating layer. For example, the amount of the binder composition may be about 1% by weight to about 30% by weight based on the total weight of the coating layer. For example, the amount of the binder composition may be about 1% by weight to about 20% by weight based on the total weight of the coating layer. For example, the amount of the binder composition may be about 1% by weight to about 10% by weight based on the total weight of the coating layer. When the amount of the binder composition in the coating layer is too low, it is difficult to sufficiently binding the filler. When the amount of the binder composition is too high, mechanical properties of the separator may be deteriorated.

The coating layer of the separator may include the filler having an average particle diameter of 300 nm or greater. The filler is not particularly limited, and any filler commonly used in the art may also be used.

The filler may function as a support in the separator. When the separator shrinks at a high temperature, the filler may prevent shrinking of the separator by supporting the separator. Since the separator includes the filler, sufficient porosity may be acquired and mechanical properties may be improved. A lithium battery including such a separator may have improved stability.

The filler may have an average particle diameter of about 300 nm to about 2 μm. For example, the filler may have an average particle diameter of about 300 nm to about 1.5 μm. For example, the filler may have an average particle diameter of about 300 nm to about 1.0 μm. The average particle diameter may be determined by using number average particle diameter measured by using a laser scattering particle size distribution analyzer LA-920 from Horiba Instruments, Inc. The coating layer may have an appropriate thickness by using the filler having the average particle diameter as described above, and the separator may have an appropriate porosity by using the coating layer including the filler. When the average particle diameter of the filler is less than 300 nm, the separator may not have sufficient mechanical properties.

The amount of the filler may be about 50% by weight to about 99.9% by weight based on the total weight of the coating layer. For example, the amount of the filler may be about 60% by weight to about 99.9% by weight based on the total weight of the coating layer. For example, the amount of the filler may be about 70% by weight to about 99.9% by weight based on the total weight of the coating layer. For example, the amount of the filler may be about 80% by weight to about 99.9% by weight based on the total weight of the coating layer. For example, the amount of the filler may be about 90% by weight to about 99.9% by weight based on the total weight of the coating layer. When the amount of the filler is within the range described above, physical properties of the separator may be improved.

The filler may include inorganic particles, organic particles, or any combination thereof.

The inorganic particles may include metal oxide, metalloid oxide, or any combination thereof. Particularly, the inorganic particles may include alumina, silica, boehmite, magnesia, or any combination thereof. Due to small particle size, alumina and silica may efficiently be used to prepare a dispersion. For example, the inorganic particles may include $Al_2O_3$, $SiO_2$, $TiO_2$, $SnO_2$, $CeO_2$, NiO, CaO, ZnO, MgO, $ZrO_2$, $Y_2O_3$, $SrTiO_3$, $BaTiO_3$, $MgF_2$, $Mg(OH)_2$, or any combination thereof.

The inorganic particles may have a spherical, plate, or fibrous shape, without being limited thereto. In addition, any shape commonly used in the art may be applied thereto.

The plate shaped inorganic particles may be alumina, boehmite, and the like. In this case, shrinking of the separator is further inhibited at a high temperature, and the separator may have a relatively high porosity, so that a lithium battery may have improved properties from a penetration test.

When the inorganic particles have a plate or fibrous shape, an aspect ratio of the inorganic particle may be about 1:5 to about 1:100. For example, the aspect ratio may be about 1:10 to about 1:100. For example, the aspect ratio may be about 1:5 to about 1:50. For example, the aspect ratio may be about 1:10 to about 1:50.

In a flat surface of the inorganic particles having the plate shape, a long to short length ratio may be about 1 to about 3. For example, the long to short length ratio may be about 1 to about 2 in the flat surface. For example, the long to short length ratio may be about 1 in the flat surface. The aspect ratio and the long to short length ratio may be measured by using a scanning electron microscope (SEM). When the range of the aspect ratio and the long to short length ratio are within the ranges described above, shrinking of the separator may be inhibited, and the separator may have a relatively improved porosity, so that the lithium battery may have improved properties from a penetration test.

When the inorganic particles has a plate shape, an average angle between one surface of the porous base material layer and the flat surface of the inorganic particles may be 0 to about 30. For example, the angle between the one surface of the porous base material layer and the flat surface of the inorganic particles may converge to 0. That is, one surface of the porous base material layer may be parallel to the flat surface of the inorganic particles. For example, when the average angle between the one surface of the porous base material layer and the flat surface of the inorganic particles is within the range described above, thermal shrinking of the porous base material layer may efficiently be prevented, so that the separator may have a reduced shrinkage.

The organic particles may be a cross-linked polymer. The organic particles may be a highly cross-linked polymer not having a glass transition temperature (Tg). When the highly cross-linked polymer is used, heat resistance is improved, so that shrinking of the porous base material layer may efficiently be inhibited at a high temperature.

The organic particles may include acrylate-based compounds and derivatives thereof, diallyl phthalate-based compounds and derivatives thereof, polyimide-based compounds and derivatives thereof, polyurethane-based compounds and derivatives thereof, copolymers thereof, or combinations thereof, without being limited thereto. In addition, any organic materials commonly used in the art as fillers may also be used. For example, the filler may be cross-linked polystyrene particles and cross-linked polymethyl methacrylate particles.

The filler may be secondary particles aggregated from primary particles. Since porosity of the coating layer is increased in a separator including a filler having secondary particles, a lithium battery having excellent output characteristics may be provided.

The coating layer may be formed by preparing a composition for a coating layer by mixing the filler and the binder composition, and coating the composition on the porous base material layer. A method of coating the composition for a coating layer is not particularly limited, and any method commonly used in the art may be used. For example, the coating layer may be formed by printing, compressing, pressurizing, roller coating, blade coating, brush coating, dip coating, spray coating, spin coating, or the like.

The coating layer may be applied to one surface or both surfaces of the porous base material layer. A thickness of a single coating layer may be about 0.1 to about 5 μm, about 0.5 to about 5 μm, or about 1 to about 5 μm. When the thickness of the coating layer is within the range described above, heat resistance may be improved and capacity reduction may be inhibited in a lithium battery including the coating layer.

In the separator, the porous base material layer may be a layer including polyolefin. Polyolefin has excellent short-circuit inhibiting effect and improves stability of a battery due to shut down effect. For example, the porous base material layer may be a film comprising a resin of polyolefin such as polyethylene, polypropylene, polybutene, and polyvinyl chloride, and any mixture or copolymer thereof, without being limited thereto. In addition, any porous film commonly used in the art may also be used. For example, a porous film comprising a polyolefin-based resin; a porous film in a woven fabric of a polyolefin-based fiber; a porous film in a non-woven fabric including polyolefin; and an aggregate of particles of an insulating material may be used. For example, the porous film including polyolefin may allow a polymer solution for preparing the coating layer formed on the base material layer to have excellent coating properties and may enable the preparation of a thin separator film to increase the ratio of an active material in a battery and the capacity per volume.

For example, polyolefin used to form the porous base material layer may be a homopolymer, copolymer, or mixture of polyethylene, polypropylene, and the like. Polyethylene may be classified into low-density, middle-density, and high-density polyethylene. In terms of mechanical strength, high-density polyethylene may be used. In addition, at least two types of polyethylene may be mixed to provide flexibility. A polymerization catalyst used in the preparation of the polyethylene is not particularly limited, and a Ziegler-Natta-based catalyst, a Philips-based catalyst, a metallocene-based catalyst, or the like may be used. In order to obtain both high mechanical strength and high permeation properties, a weight average molecular weight of polyethylene may be about 0.1 million to about 12 million, for example, about 0.2 million to about 3 million. Polypropylene may be in the form of a homopolymer, random copolymer, and a block copolymer and may be used alone or in a combination of at least two thereof. In addition, a polymerization catalyst is not particularly limited, and a Ziegler-Natta-based catalyst, a metallocene based catalyst, or the like may be used. Also, tacticity is not limited, and isotactic, syndiotactic, or atactic may be used, and for example, relatively inexpensive isotactic polypropylene may be used. Furthermore, additives such as a polyolefin in addition to polyethylene or polypropylene and an antioxidant may also be added to the polyolefin within the scope not impairing the effect of embodiments.

For example, the porous base material layer may include polyolefin such as polyethylene and polypropylene and may have a multi-layered structure including two or more layers. A polyethylene/polypropylene double-layered separator, a polyethylene/polypropylene/polyethylene triple-layered separator, a polypropylene/polyethylene/polypropylene triple-layered separator, and the like may be used, without being limited thereto. In addition, any material commonly used in the art as a porous base material layer may also be used.

In the separator, a thickness of the porous base material layer may be about 1 μm to about 100 μm. For example, the thickness of the porous base material layer may be about 1 μm to about 30 μm. For example, the thickness of the porous base material layer may be about 5 μm to about 30 μm. When the thickness of the porous base material layer is less than 1 μm, mechanical properties of the porous base material layer may not be maintained. When the thickness of the porous base material layer is greater than 100 μm, battery resistance may increase.

In the separator, a porosity of the porous base material layer may be about 5% to about 95%. When the porosity is less than about 5%, battery resistance may increase. When the porosity is greater than about, mechanical properties of the porous base material layer may not be maintained.

In the separator, a diameter of a pore in the porous base material layer may be about 0.01 μm to about 50 μm. For example, the diameter of a pore in the porous base material layer may be about 0.1 μm to about 20 μm. When the diameter of the pore is less than 0.01 μm, battery resistance may increase. When the diameter of the pore is greater than 50 μm, mechanical properties of the porous base material layer may not be maintained.

A thermal shrinkage of the separator in a longer axial direction measured after maintaining the separator at 130° C. for 10 minutes and cooling the separator at room temperature may be 4% or less. For example, the thermal shrinkage of the separator in a longer axial direction measured after maintaining the separator at 130° C. for 10 minutes and cooling the separator at room temperature may be 3% or less. For example, the thermal shrinkage of the separator in a longer axial direction measured after maintaining the separator at 130° C. for 10 minutes and cooling the separator at room temperature may be 2.6% or less. The thermal shrinkage may be obtained by dividing a reduced length of the separator in the longer axial direction after thermal shrinking by the longer length of the separator before thermal shrinking.

The thermal shrinkage of the separator in a longer axial direction measured after maintaining the separator at 150° C. for 10 minutes and cooling the separator at room temperature may be 40% or less. For example, the thermal shrinkage of the separator in a longer axial direction measured after maintaining the separator at 150° C. for 10 minutes and cooling the separator at room temperature may be 30% or less. For example, the thermal shrinkage of the separator in a longer axial direction measured after main-taining the separator at 150° C. for 10 minutes and cooling the separator at room temperature may be 28% or less. The thermal shrinkage may be obtained by dividing a reduced length of the separator in the longer axial direction after thermal shrinking by the longer length of the separator before thermal shrinking.

In addition, the separator may include a diene-based polymer prepared by polymerizing a monomer composition including a diene-based monomer. The diene-based monomer may be a conjugated diene-based monomer or a non-conjugated diene-based monomer. For example, the diene-based monomer may include at least one selected from the group consisting of 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinylnorbornene, dicyclopentadiene, and 1,4-hexadiene. However, the diene-based monomer is not limited thereto, and any diene-based monomer commonly used in the art may also be used.

Figure 2:
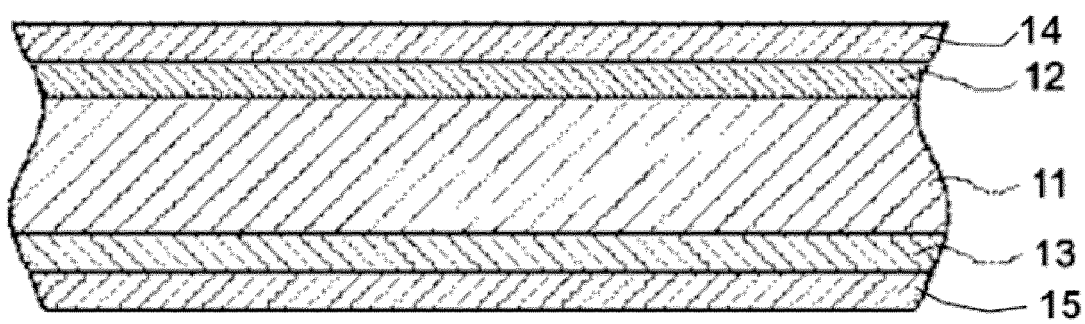
FIG. 2 is a schematic diagram of a separator according to another embodiment.

The separator may further include an adhesive layer disposed on the coating layer. For example, the separator may have a structure including a porous base material layer 11, coating layers 12 and 13 disposed on at least one surface of the porous base material layer 11, and adhesive layers 14 and 15 respectively disposed on at least one surface of the coating layers 12 and 13 as illustrated in FIG. 2.

Since the separator further includes the adhesive layers 14 and 15, binding force between the separator and each of the electrodes may be improved. For example, the adhesive layer stably binds the electrodes with the separator in a pouch type battery in which a flexible packing material such as a laminate film is used, thereby preventing deterioration of the battery caused by detachment of the electrodes from the separator and fixing the position of the separator.

The adhesive layer may include a binder same as that of the coating layer; a binder different from that of the coating layer and including an acrylate-based binder a fluorinated binder, a rubber binder, or any combination thereof; a binder comprising inorganic particles, organic particles, or any combination thereof, or an organic polymer; or any combination thereof.

For example, the adhesive layer may include the same binder composition as that of the coating layer. When the adhesive layer includes the same binder composition as that of the coating layer, binding force between the coating layer and the adhesive layer may further be improved. Particularly, the binder composition contained in the adhesive layer may include first nanoparticles having an average particle diameter of 100 nm or less and a first polymer binder having a glass transition temperature of 20° C. or less. The first nanoparticles and first polymer binder are as described above.

In addition, for example, the adhesive layer may include another binder instead of the binder composition including the first polymer binder or may further include another binder different from the first polymer binder.

For example, the adhesive layer may be an acrylate-based binder, a fluorinated binder, a rubber binder, or any combination thereof, without being limited thereto. In addition, any compound commonly used in the art as a binder of an adhesive layer may also be used.

The acrylate-based binder refers to an acrylate-based polymer or copolymer. Examples of the acrylate-based binder include poly(metha)acrylate, polyalkyl(metha)acrylate, polyacrylonitrile, or any combination thereof, without being limited thereto. In addition, any acrylate-based binder commonly used in the art as the binder of the adhesive layer may also be used.

Examples of the fluorinated binder may include polyvinylidene fluoride, polytetrafluoroethylene, or any combination thereof, without being limited thereto. In addition, any fluorinated binder commonly used in the art as the binder of the adhesive layer may also be used.

Examples of the rubber binder may include styrene-butadiene rubber, acrylate styrene-butadiene rubber, acrylonitrile-butadiene rubber, acrylonitrile-butadiene-styrene rubber, acrylic rubber, butyl rubber, fluorinated rubber, or any combination thereof, without being limited thereto. In addition, any rubber binder commonly used in the art as the binder of the adhesive layer may also be used.

In addition, for example, the adhesive layer may include a binder including inorganic particles, organic particles, or any combination thereof; and an organic polymer.

The inorganic particles may be the same as or different from the filler contained in the coating layer. For example, the inorganic particles may be colloidal silica or alumina.

The organic particles may be the same as or different from the polymer particles contained in the coating layer.

The inorganic particles, organic particles, and any combination thereof may have an average particle diameter of about 1 to about 100 nm. Particularly, the average particle diameter may be about 5 to about 90 nm, about 5 to about 80 nm, about 5 to about 70 nm, and about 5 to about 50 nm. The coating layer of the separator may have appropriate strength by using an inorganic compound having a particle diameter within the range described above. When the particle diameter is less than 1 nm, dispersity of the composition may be deteriorated. When the particle diameter is greater than 100 nm, strength of the separator may be decreased.

The amount of the inorganic particles, organic particles, or any combination thereof may be about 10 to about 100 parts by weight based on 100 parts by weight of the organic polymer. Particularly, the amount of the inorganic particles, organic particles, or any combination thereof may be in the range of about 20 to about 80 parts by weight, or about 20 to about 60 parts by weight. When the amount of the inorganic particles, organic particles, or any combination thereof is within the range described above, the adhesive layer may have appropriate strength and sufficient adhesive force.

Examples of the organic polymer may include a diene-based polymer, an acrylate-based polymer, a styrene-based polymer, a urethane-based polymer, a polyolefin-based polymer, or any combination thereof.

The organic polymer may have a glass transition temperature (Tg) of about −50 to about 60° C., for example, about −40 to about 20° C.

The organic polymer may have a particle diameter of about 0.05 μm to about 0.5 μm, for example, about 0.08 μm to about 0.2 μm in a state of being dispersed in a solvent. When the organic polymer has the particle diameter within the range described above, appropriate viscosity may be obtained. Thus, a lithium secondary battery including a separator including the adhesive layer may have improved stability.

The adhesive layer may be disposed on one surface of the coating layer. A thickness of the adhesive layer may be about 0.1 to about 5 μm, about 0.5 to about 5 μm, or about 1 to about 5 μm. When the thickness of the adhesive layer is within the range described above, the adhesive layer may maintain stable and excellent binding strength with the coating layer and the electrodes.

A separator according to another embodiment includes a porous base material layer; a coating layer disposed on at least one surface of the porous base material layer; and an adhesive layer disposed on the coating layer. The adhesive layer includes a binder composition, wherein the binder composition has first nanoparticles having an average particle diameter of about 100 nm or less and a first polymer binder having a glass transition temperature of about 20° C. or less. The separator has excellent flexibility, and thermal shrinking thereof is inhibited due to improved heat resistance of the film, so that stability of a battery may be improved.

The separator may include: a porous base material layer; a coating layer disposed on at least one surface of the porous base material layer; and an adhesive layer disposed on the coating layer. The adhesive layer includes a binder composition, and a binder film comprising the binder composition has an elongation of 10% or less measured after maintaining the binder film under a load of 50 g at 150° C. for 10 minutes.

The separator may include: a porous base material layer; a coating layer disposed on at least one surface of the porous base material layer; and an adhesive layer disposed on the coating layer. The adhesive layer includes a binder composition, and a breaking strength of a binder film comprising the binder composition measured after being immersed in an electrolytic solution may be 40 Kg/cm$^2$ or greater. The separator may have high flexibility and low contraction rate.

For example, the separator may have a structure including a porous base material layer 11, coating layers 12 and 13 disposed on at least one surface of the porous base material layer 11, and adhesive layers 14 and 15 respectively disposed on at least one surface of the coating layers 12 and 13 as illustrated in FIG. 2.

The coating layer of the separator may include: an acrylate-based binder, a fluorinated binder, a rubber binder, or any combination thereof; a binder including inorganic particles, organic particles, or any combination thereof, and an organic polymer; or any combination thereof. The binders used in the coating layer are as described above.

The inorganic particles, organic particles, and any combination thereof may have an average particle diameter of about 1 to about 100 nm. Particularly, the average particle diameter may be about 5 to about 90 nm, about 5 to about 80 nm, about 5 to about 70 nm, and about 5 to about 50 nm. The coating layer of the separator may have appropriate strength by using an inorganic compound having a particle diameter within the range described above. When the particle diameter is less than 1 nm, dispersity of the composition may be deteriorated. When the particle diameter is greater than 100 nm, strength of the separator may be decreased.

The coating layer of the separator may further include a filler.

A lithium battery according to another embodiment includes: a positive electrode; a negative electrode; an organic electrolytic solution; and the aforementioned separator interposed between the positive electrode and the negative electrode. By using the separator, the lithium battery may have improved stability and lifespan characteristics.

For example, the lithium battery may be manufactured in the following manner.

First, a negative active material, a conductive agent, a binder, and a solvent are mixed to prepare a negative active material composition. The negative active material composition may be directly coated on a metallic current collector to prepare a negative electrode plate. Alternatively, the negative active material composition may be cast on a separate support to form a negative active material film, and then the negative active material film, which is separated from the support, may be laminated on a metallic current collector to prepare a negative electrode plate. The negative electrode is not limited to the examples described above, and may have various other shapes.

The negative active material may be a non-carbonaceous material. For example, the negative active material may include at least one selected from the group consisting of a metal that is alloyable with lithium, an alloy of the metal, and an oxide of the metal.

For example, the metal that is alloyable with lithium may include Si, Sn, Al, Ge, Pb, Bi, Sb, Si—Y alloy (Y is alkali metal, alkali earth metal, Groups XIII to XVI elements, transition metal, rare earth elements, or any combination thereof (except for Si)), Sn—Y alloy (Y is alkali metal, alkali earth metal, Groups XIII to XVI elements, transition metal, rare earth elements, or any combination thereof (except for Sn)), and the like. In this regard, Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or any combination thereof.

For example, the transition metal oxide may include lithium titanium oxide, vanadium oxide, lithium vanadium oxide, and the like.

For example, the non-transition metal oxide may be $SnO_2$, $SiO_x$ (0<x<2), and the like.

The negative active material may include at least one selected from the group consisting of Si, Sn, Pb, Ge, Al, $SiO_x$ (0<x≤2), $SnO_y$ (0<y≤2), $Li_4Ti_5O_{12}$, $TiO_2$, $LiTiO_3$, and $Li_2Ti_3O_7$, without being limited thereto. Any compound commonly used in the art as the non-carbonaceous negative active material may also be used.

In addition, a complex of the non-carbonaceous negative active material and the carbonaceous material may also be used. The negative active material may further include a carbonaceous negative active material in addition to the non-carbonaceous material.

The carbonaceous material may include crystalline carbon, amorphous carbon, or any mixture thereof. Examples of the crystalline carbon include natural graphite or artificial graphite that are in non-shaped, plate, flake, spherical or fibrous form. Examples of the amorphous carbon include soft carbon (carbon sintered at low temperature), hard carbon, mesophase pitch carbides, sintered corks, and the like.

Examples of the conductive agent may include carbonaceous materials, such as acetylene black, ketjen black, natural graphite, artificial graphite, carbon black, and carbon fiber, and metal-based materials such as copper, nickel, aluminum, silver in powder form of fiber form. In addition, a mixture of at least one conductive material such as polyphenylene derivatives may be used, without being limited thereto. In addition, any conductive agent commonly used in the art may also be used. In addition, the aforementioned crystalline carbonaceous material may further be added thereto.

Examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer, but are not limited thereto. Any binder commonly used in the art may also be used.

Examples of the solvent include N-methyl-pyrrolidone, acetone, and water, but are not limited thereto. Any solvent commonly used in the art may also be used.

Here, the amounts of the negative electrode active material, the conductive agent, the binder, and the solvent used in the manufacture of the lithium battery are amounts generally used in the art. At least one of the conductive agent, the binder and the solvent may not be used according to the use and the structure of the lithium battery.

The binder used to prepare the negative electrode may be the same as the binder composition contained in the coating layer of the separator.

Then, a positive active material, a conductive agent, a binder, and a solvent are mixed to prepare a positive active material composition. The positive active material composition is directly coated on a metallic current collector and dried to prepare a positive electrode plate. Alternatively, the positive active material composition may be cast on a separate support, and then a positive active material film separated from the support is laminated on a metallic current collector to prepare a positive electrode plate.

The positive active material may include at least one selected from the group consisting of lithium cobalt oxide, lithium nickel cobalt manganese oxide, lithium nickel cobalt aluminum oxide, lithium iron phosphate, and lithium manganese oxide, without being limited thereto. In addition, any positive active material commonly used in the art may also be used.

For example, a compound represented by $Li_aA_{1-b}B_bD_2$ ($0.90 \leq a \leq 1.8$, and $0 \leq b \leq 0.5$); $Li_aE_{1-b}B_bO_{2-c}D_c$ ($0.90 \leq a \leq 1.8$, $0 \leq b \leq 0.5$, $0 \leq c \leq 0.05$); $LiE_{2-b}B_bO_{4-c}D_c$ ($0 \leq b \leq 0.5$, $0 \leq c \leq 0.05$); $Li_aNi_{1-b-c}Co_bB_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}F_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}F_2$ ($0.90 \leq a \leq 1.8$, $0 \leq b \leq 0.5$, $0 \leq c \leq 0.05$, $0 < \alpha < 2$); $Li_aNi_{1-b-c}Mn_bB_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}F_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); or $LiFePO_4$ May be used.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The compounds listed above have a surface coating layer. Alternatively, a mixture of a compound without having a coating layer and a compound having a coating layer may be used. The coating layer may include oxide, hydroxide, oxyhydroxide, oxycarbonate, or hydroxycarbonate of a coating element. The compounds for the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. A method of forming the coating layer may be any method, for example, spray coating, dip coating, and the like, which do not adversely affect the physical properties of the positive active material when a compound of such a coating element is used. This is obvious to those of skill in the art, and thus a detailed description thereof will be omitted.

For example, $LiNiO_2$, $LiCoO_2$, $LiMn_xO2_x$ (x=1, 2), $LiNi_{1-x}Mn_xO_2$ ($0 < x < 1$), $LiNi_{1-x-y}Co_xMn_yO_2$ ($0 \leq x \leq 0.5$, $0 \leq y \leq 0.5$), $LiFeO_2$, $V_2O_5$, TiS, MoS, and the like may be used.

The conductive agent, the binder, and the solvent used for the positive active material composition may be the same as those used for the negative active material composition. A plasticizer may further be added to the positive active material composition and/or the negative active material composition to form pores inside the electrode plates.

Here, the amounts of the positive active material, the conductive agent, the binder, and the solvent used in the manufacture of the lithium battery are amounts generally used in the art. At least one of the conductive agent, the binder, and the solvent may not be used according to the use and the structure of the lithium battery.

The binder used to prepare the positive electrode may be the same as the binder composition contained in the coating layer of the separator.

Then, the separator is interposed between the positive electrode and the negative electrode.

As described above, the separator includes: a porous base material layer; and a coating layer disposed on at least one surface of the porous base material layer. The coating layer has: a filler having an average particle diameter of 300 nm or greater; and a binder composition. The binder composition includes: first nanoparticles having an average particle diameter of 100 nm or less; and a first polymer binder having a glass transition temperature of 20° C. or less. A binder film comprising the binder composition and immersed in an electrolytic solution has a breaking strength of 25 Kg/cm² or greater.

Then, an electrolyte is prepared.

The electrolyte is in a liquid or gel state.

For example, the electrolyte may be an organic electrolytic solution. Alternately, the electrolyte may be in a solid phase. For example, the electrolyte may be boron oxide or lithium oxynitride, but is not limited thereto. In addition, any solid electrolyte commonly used in the art may also be used. The solid electrolyte may be formed on the negative electrode by, for example, sputtering.

For example, an organic electrolytic solution may be prepared. The organic electrolytic solution may be prepared by dissolving a lithium salt in an organic solvent.

The organic solvent may be any solvent commonly used in the art. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any lithium salt commonly used in the art. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (Here, x and y are natural number), LiCl, LiI, or any mixture thereof.

Figure 3:
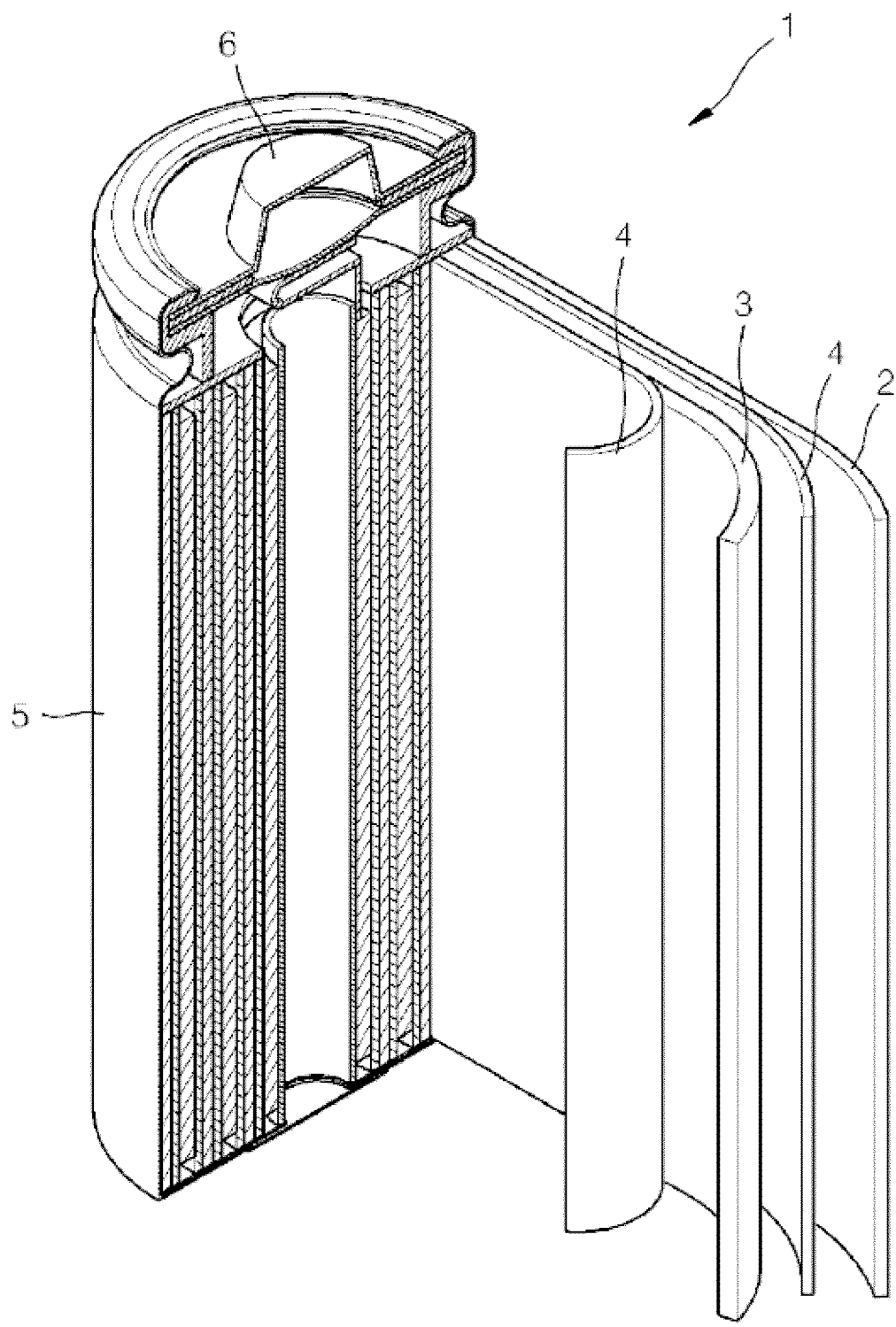
FIG. 3 is a schematic diagram of a lithium battery according to an embodiment.

Referring to FIG. 3, a lithium battery 1 includes a positive electrode 3, a negative electrode 3, and a separator 4. The positive electrode 3, the negative electrode 2, and the separator 4 are wound up or folded, and then sealed in a battery case 5. Then, the battery case 5 is filled with an organic electrolytic solution and sealed with a cap assembly 6, thereby completing the manufacture of the lithium battery 1. The battery case 5 may be a cylindrical type, a rectangular type, or a thin-film type. For example, the lithium battery may be a thin-film type battery. The lithium battery may be a lithium ion battery. The lithium battery may be a lithium polymer battery.

The separator may be interposed between the positive and the negative electrode to form a battery assembly. Alternatively, the battery assembly may be stacked in a bi-cell structure and impregnated with the electrolytic solution. The resultant is put into a pouch and hermetically sealed, thereby completing the manufacture of a lithium ion polymer battery.

Alternatively, a plurality of battery assemblies may be stacked to form a battery pack, which may be used in any device that requires high capacity and high output, for example, in a laptop computer, a smart phone, electric vehicle, and the like.

Particularly, the lithium battery may be suitable for electric vehicles (EVs) due to high rate-characteristics and excellent lifespan characteristics. For example, the lithium battery may be applied to hybrid electric vehicles such as plug-in hybrid electric vehicles (PHEVs).

The present embodiments will now be described in further detail with reference to the following examples. However, these examples are not intended to limit the scope of the one or more embodiments.

Preparation of Emulsion of First Polymer Binder Particles

Preparation Example 1 (Binder A)

Inside of a flask reactor equipped with a condenser, a thermometer, a monomer emulsion inlet, a nitrogen gas inlet, and a stirrer, was replaced with nitrogen, and then 200 parts by weight of distilled water and 0.5 parts by weight of dodecylbenzenesulfonic acid sodium salt were added thereto, and the mixture was heated to 60° C. Then, a monomer mixture including 1.0 parts by weight of potassium persulfate, 0.5 parts by weight of sodium bisulfite, 0.2 parts by weight of α-methylstyrene dimer, 0.2 parts by weight of t-dodecyl mercaptan, 34 parts by weight of 1,3-butadiene, 30 parts by weight of styrene, 17 parts by weight of methyl methacrylate, 10 parts by weight of acrylonitrile, 7 parts by weight of methacrylic acid, and 2 parts by weight of acrylic acid was added to a reactor at 45° C. and maintained. When a polymerization conversion rate reached 40%, 0.4 parts by weight of t-dodecyl mercaptan was added thereto, and reaction was further performed. When the polymerization conversion rate reached 80%, the reaction temperature was increased to 60° C., and reaction was further performed for 6 hours. Thus, the polymerization conversion rate reached 98%. Then, the reaction solution was cooled to 20° C., and remaining monomers were removed in a reduced pressure. Then, a solid content was adjusted to 40% while adjusting the pH to 7.0 using a 5% by weight of a lithium hydroxide aqueous solution, thereby obtaining an acrylic acid ester-based polymer emulsion. The polymer binder dispersed in the emulsion had an average particle diameter of 120 nm. The polymer binder particles had a Tg of 17° C. and a gel content of 70%.

The polymer binder includes a carboxyl group (—COOH) as a polar functional group.

Preparation Example 2 (Binder B)

Inside of a flask reactor equipped with a condenser, a thermometer, a monomer emulsion inlet, a nitrogen gas inlet, and a stirrer, was replaced with nitrogen, and then 200 parts by weight of distilled water and 0.5 parts by weight of dedecylbenzenesulfonic acid sodium salt were added thereto, and the mixture was heated to 60° C. Then, a monomer mixture including 1.0 parts by weight of potassium persulfate, 0.5 parts by weight of sodium bisulfite, 0.2 parts by weight of α-methylstyrene dimer, 0.2 parts by weight of t-dodecyl mercaptan, 34 parts by weight of 1,3-butadiene, 31 parts by weight of styrene, 12 parts by weight of methyl methacrylate, 15 parts by weight of acrylonitrile, 2 parts by weight of methacrylic acid, 2 parts by weight of acrylic acid, and 4 parts by weight of hydroxyethyl methacrylate was added to a reactor at 45° C. and maintained. When a polymerization conversion rate reached 40%, 0.3 parts by weight of t-dodecyl mercaptan was added thereto, and reaction was further performed. When the polymerization conversion rate reached 80%, the reaction temperature was increased to 60° C., and reaction was further performed for 6 hours. Thus, the polymerization conversion rate reached 98%. Then, the reaction solution was cooled to 20° C., and remaining monomers were removed in a reduced pressure. Then, a solid content was adjusted to 40% while adjusting the pH to 7.0 using a 5% by weight of a lithium hydroxide aqueous solution, thereby obtaining an acrylic acid ester-based polymer emulsion. The polymer binder dispersed in the emulsion had an average particle diameter of 110 nm. The polymer binder particles had a Tg of 11° C. and a gel content of 72%.

The polymer binder includes a hydroxyl group (—OH) as a polar functional group.

Preparation of Emulsion of First Nanoparticles

Preparation Example 3 (Nanoparticles C)

Inside of a flask reactor equipped with a condenser, a thermometer, a monomer emulsion inlet, a nitrogen gas inlet, and a stirrer, was replaced with nitrogen, and then 500 parts by weight of distilled water and 3 parts by weight of dedecylbenzenesulfonic acid sodium salt were added thereto, and the mixture was heated to 80° C. Then, 2 parts by weight of methyl methacrylate was added to the reactor and stirred for 5 minutes, and 20 parts by weight of a 5% ammonium persulfate aqueous solution was added to the reactor to initiate reaction. After one hour, a monomer emulsion including 93 parts by weight of methylmethacrylate, 2 parts by weight of acrylic acid, 4 parts by weight of methacrylic acid, 1 parts by weight of ethylenedimethacrylate, 0.5 parts by weight of dodecylbenzenesulfonic acid sodium salt, and 40 parts by weight of distilled water was added dropwise to the reactor for 3 hours. Simultaneously, 10 parts by weight of a 5% ammonium persulfate aqueous solution was added dropwise thereto for 3 hours. The adding of the monomer emulsion was stopped and the reaction was further performed for 1 hour, so that a polymerization conversion rate reached 98.9%. Then, the reaction solution was cooled to 20° C., and remaining monomers were removed in a reduced pressure. Then, a solid content was adjusted to 15% while adjusting the pH to 8.0 using a 5% by weight of a lithium hydroxide aqueous solution, thereby obtaining an emulsion including polymer particles having a Tg of 100° C. The polymer particles dispersed in the emulsion had an average particle diameter of 70 nm.

Preparation Example 4 (Nanoparticles D)

Inside of a flask reactor equipped with a condenser, a thermometer, a monomer emulsion inlet, a nitrogen gas inlet, and a stirrer, was replaced with nitrogen, and then 500 parts by weight of distilled water and 3 parts by weight of dedecylbenzenesulfonic acid sodium salt were added thereto, and the mixture was heated to 80° C. Then, 2 parts by weight of methyl methacrylate was added to the reactor and stirred for 5 minutes, and 20 parts by weight of a 5% ammonium persulfate aqueous solution was added to the reactor to initiate reaction. After one hour, a monomer emulsion including 97 parts by weight of methylmethacrylate, 2 parts by weight of hydroxy ethylmethacrylate, 1 parts by weight of ethylenedimethacrylate, 2 parts by weight of dodecylbenzenesulfonic acid sodium salt, and 40 parts by weight distilled water was added dropwise to the reactor for 3 hours. Simultaneously, 10 parts by weight of a 5% ammonium persulfate aqueous solution was added dropwise thereto for 3 hours. The adding of the monomer emulsion was stopped and the reaction was further performed for 1 hour, so that a polymerization conversion rate reached 98.7%. Then, the reaction solution was cooled to 20° C., and remaining monomers were removed in a reduced pressure. Then, a solid content was adjusted to 15% while adjusting the pH to 8.0 using a 5% by weight of a lithium hydroxide aqueous solution, thereby obtaining an emulsion including polymer particles having a Tg of 108° C. The polymer particles dispersed in the emulsion had an average particle diameter of 90 nm.

Preparation of Binder Composition and Separator

Example 1

Preparation of Binder Composition 20 parts by weight (on a dry weight basis) of the polymer emulsion (having a solid content of 15% by weight) having an average particle diameter of 70 nm prepared in Preparation Example 3 was added to 100 parts by weight (on a dry weight basis) of the polymer emulsion (binder A, a solid content of 40% by weight) having an average particle diameter of 120 nm prepared in Preparation Example 1, and 1 part by weight (on a dry weight basis) of a carbodiimide binding agent (Carbodilite V-02-L2, Nisshinbo Chemical Inc.) was added thereto. The mixture was stirred for 10 minutes to prepare a binder composition.

Preparation of Separator 100 parts by weight of alumina (AKP-3000, Sumitomo Chemical Co., Ltd.) having an average particle diameter of about 0.4 to about 0.6 μm as a filler, 6 parts by weight (on a dry weight basis) of the binder composition, and 0.5 parts by weight of a dispersant (Aron T-40, Toagosei Chemicals Industry Co., Japan) were mixed to prepare a coating layer forming composition.

The coating layer forming composition was coating on both surfaces of a polyethylene porous base material layer having a thickness of 16 μm by gravure printing to prepare a separator. A thickness of a single coating layer was 3 μm.

Example 2

A separator was prepared in the same manner as in Example 1, except that the amount of the polymer emulsion (a solid content of 15% by weight) having an average particle diameter of 70 nm prepared in Preparation Example 3 was changed from 20 parts by weight to 30 parts by weight.

Example 3

A separator was prepared in the same manner as in Example 1, except that the amount of the polymer emulsion (a solid content of 15% by weight) having an average particle diameter of 70 nm prepared in Preparation Example 3 was changed from 20 parts by weight to 40 parts by weight.

Example 4

Preparation of Binder Composition 20 parts by weight (on a dry weight basis) of the polymer emulsion (having a solid content of 15% by weight) having an average particle diameter of 90 nm prepared in Preparation Example 4 was added to 100 parts by weight (on a dry weight basis) of the polymer emulsion (binder B, a solid content of 40% by weight) having an average particle diameter of 120 nm prepared in Preparation Example 2, and 1 part by weight (on a dry weight basis) of γ-glycidoxy propyltrimethoxysilane as a silane coupling agent was added thereto. The mixture was stirred for 10 minutes to prepare a binder composition.

Preparation of Separator 100 parts by weight of alumina (AKP-3000, Sumitomo Chemical Co., Ltd.) having an average particle diameter of about 0.4 to about 0.6 μm as a filler, 6 parts by weight (on a dry weight basis) of the binder composition, and 0.5 parts by weight of a dispersant (Aron T-40, Toagosei Chemicals Industry Co., Japan) were mixed to prepare a coating layer forming composition.

The coating layer forming composition was coating on both surfaces of a polyethylene porous base material layer having a thickness of 16 μm by gravure printing to prepare a separator. A thickness of a single coating layer was 3 μm.

Example 5

A separator was prepared in the same manner as in Example 4, except that the amount of the polymer emulsion (a solid content of 15% by weight) having an average particle diameter of 90 nm prepared in Preparation Example 4 was changed from 20 parts by weight to 30 parts by weight.

Example 6

A separator was prepared in the same manner as in Example 4, except that the amount of the polymer emulsion (a solid content of 15% by weight) having an average particle diameter of 90 nm prepared in Preparation Example 4 was changed from 20 parts by weight to 40 parts by weight.

Example 7 ($MGF_2$)

A separator was prepared in the same manner as in Example 1, except that 40 parts by weight of magnesium fluoride (CIK NanoTek, Japan) having an average particle diameter of 50 nm was added instead of 20 parts by weight (on a dry weight basis) of the polymer emulsion (a solid content of 15% by weight) having an average particle diameter of 70 nm prepared in Preparation Example 3.

Example 8 (Cross-Linked PMMA)

A separator was prepared in the same manner as in Example 1, except that 25 parts by weight (on a dry weight basis) of a cross-linked polymethylmethacrylate emulsion (Nippon Shokubai, EPOSTAR 2B20), Tg of which is not measurable, having an average particle diameter of 50 nm was added instead of 20 parts by weight (on a dry weight basis) of the polymer emulsion (a solid content of 15% by weight) having an average particle diameter of 70 nm prepared in Preparation Example 3.

Example 9 (PU)

A separator was prepared in the same manner as in Example 1, except that 30 parts by weight (on a dry weight basis) of a polyurethane emulsion (a solid content of 35% by weight) having an average particle diameter of 30 nm was added instead of 20 parts by weight (on a dry weight basis) of the polymer emulsion (a solid content of 15% by weight) having an average particle diameter of 70 nm prepared in Preparation Example 3.

The polyurethane emulsion having a solid content of 35% by weight was prepared adding 150 parts by weight of ion-exchanged water to 100 parts by weight of a commercially available polyurethane emulsion (SUPERFLEX 130, Dai-ichi Kogyo Seiyaku Co., Ltd., Tg: 101° C.), and removing a solvent in a rotary evaporator in a reduced pressure until the solid content reaches 35% by weight.

Comparative Example 1

A separator was prepared in the same manner as in Example 1, except that the amount of the polymer emulsion (a solid content of 15% by weight) having an average particle diameter of 70 nm prepared in Preparation Example 3 was changed from 20 parts by weight to 5 parts by weight.

Comparative Example 2

A separator was prepared in the same manner as in Example 4, except that the amount of the polymer emulsion (a solid content of 15% by weight) having an average particle diameter of 90 nm prepared in Preparation Example 4 was changed from 20 parts by weight to 120 parts by weight.

Comparative Example 3

A separator was prepared in the same manner as in Example 1, except that the polymer emulsion (a solid content of 15% by weight) having an average particle diameter of 70 nm prepared in Preparation Example 3 was not used.

Example 10

A separator was prepared in the same manner as in Example 1, except that the amount of the polymer emulsion (a solid content of 15% by weight) having an average particle diameter of 70 nm prepared in Preparation Example 3 was changed from 20 parts by weight to 30 parts by weight, and a coating layer was formed by using a coating layer forming composition prepared by mixing 6 parts by weight (on a dry weight basis) of the binder composition and 0.5 parts by weight of a dispersant (Aron T-40, Toagosei Chemicals Industry Co., Japan) without adding the alumina filler thereto.

Preparation of Lithium Battery

Example 11

Preparation of Negative Electrode

97% by weight of graphite particles having an average particle diameter of 25 μm (C1SR, Japan), 1.5% by weight of a styrene-butadiene rubber (SBR) binder (ZEON), and 1.5% by weight of carboxymethylcellulose (CMC, NIPPON A&L) were mixed. The mixture was added to distilled water and stirred using a mechanical stirrer for 60 minutes to prepare a negative active material slurry. The negative active material slurry was coated on a copper current collector having a thickness of 10 μm using a doctor blade and dried with a hot-air dryer at 100° C. for 0.5 hours. The coating was further dried in a vacuum at 120° C. for 4 hours and roll-pressed to prepare a negative electrode plate.

Preparation of Positive Electrode

97% by weight of $LiCoO_2$, 1.5% by weight of carbon black powder as a conductive agent, and 1.5% by weight of polyvinylidene fluoride (PVdF, SOLVAY) were mixed. The mixture was added to an N-methyl-2-pyrrolidone solvent and stirred using a mechanical stirrer for 30 minutes to prepare a positive active material slurry. The positive active material slurry was coated on an aluminum current collector having a thickness of 20 μm using a doctor blade and dried with a hot-air dryer at 100° C. for 0.5 hours. The coating was further dried in a vacuum at 120° C. for 4 hours and roll-pressed to prepare a positive electrode plate.

Assembling of Battery

The separator prepared in Example 1 was interposed between the positive electrode plate and the negative electrode plate, and the resultant was put into a pouch. The pouch was filled with an electrolytic solution, hermetically sealed, and pressed at 100° C. to prepare a pouch cell.

The electrolytic solution was prepared by dissolving 1.3 M LiPF6 in a mixed solvent including ethylene carbonate (EC)/ethylmethyl carbonate (EMC)/diethyl carbonate (DEC) in a volume ratio of 3/5/2.

Examples 12 to 20

Lithium batteries were prepared in the same manner as in Example 11, except that the separators prepared in Examples 2 to 10 were respectively used.

Comparative Examples 4 to 6

Lithium batteries were prepared in the same manner as in Example 11, except that the separators prepared in Comparative Examples 1 to 3 were respectively used.

Evaluation Example 1: Measurement of Breaking Strength of Binder Film

The binder compositions prepared according to Examples 1 to 10 and Comparative Examples 1 to 3 were added to Teflon petri dishes each having a diameter of 12 cm and dried at room temperature for 2 days to prepare binder films each having a thickness of 0.6 mm. The binder films were dried in a vacuum drier at 70° C. for 10 hours to sufficiently remove moisture. Binder samples for strength test each having a length of 5 cm and a width of 5 cm were prepared from the dried binder films.

Figure 4:
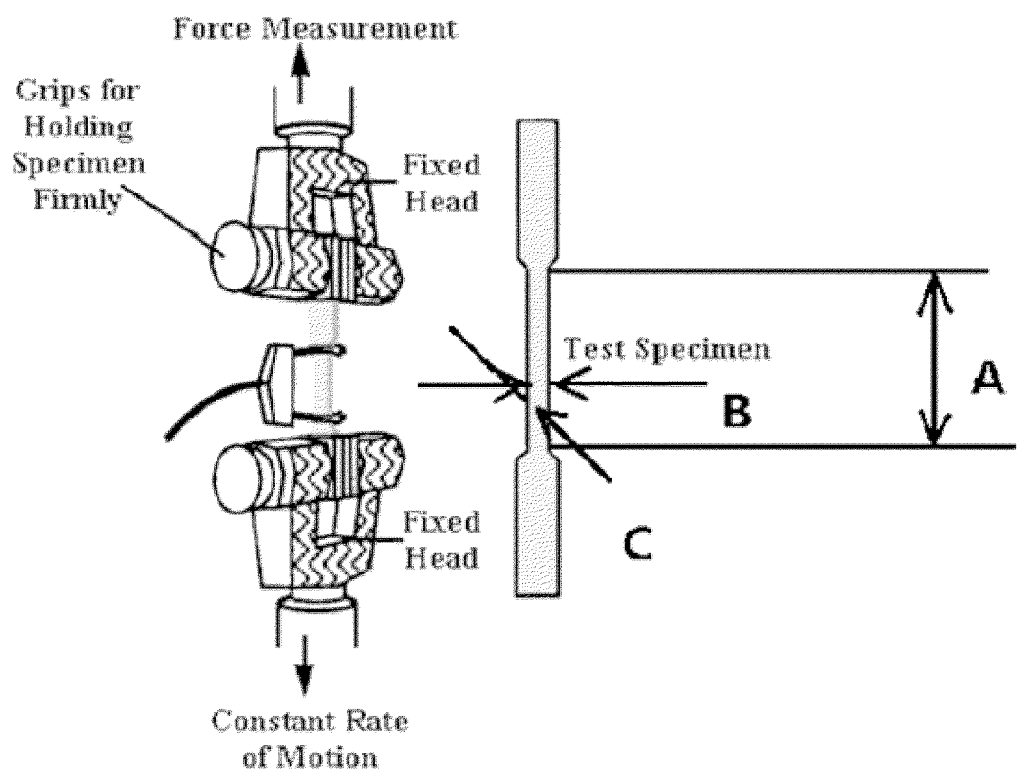
FIG. 4 is a schematic diagram of a breaking strength measuring device.

The width, the length, and a thickness of each binder sample are respectively indicated A, B, and C in FIG. 4.

The binder samples were immersed in a mixed solvent, as an electrolytic solution, including ethylene carbonate (EC), ethylmethyl carbonate (EMC), and diethyl carbonate (DEC) at a volume ratio of 3:5:2 at 70° C. for 72 hours. Then, the electrolytic solution was removed, and breaking strength of the binder samples was measured using a tension tester at a tension speed of 100 cm/min.

Breaking strength of the film immersed in the electrolytic solution was measured using Equation 1 below by using results of four samples.

Strength of sample=greatest breaking strength×0.5+ second greatest breaking strength×0.3+third greatest breaking strength×0.1+weakest breaking strength×0.1     Equation 1

The results are shown in Table 1 below.

Evaluation Example 2: Evaluation of Heat Resistance of Binder Film

The binder compositions prepared according to Examples 1 to 10 and Comparative Examples 1 to 3 were added to Teflon petri dishes each having a diameter of 12 cm and dried at room temperature for 2 days to prepare binder films each having a thickness of 0.6 mm. The binder films were dried in a vacuum drier at 70° C. for 10 hours to sufficiently remove moisture. Binder samples for strength test each having a length of 5 cm and a width of 5 cm were prepared from the dried binder films.

Figure 5:
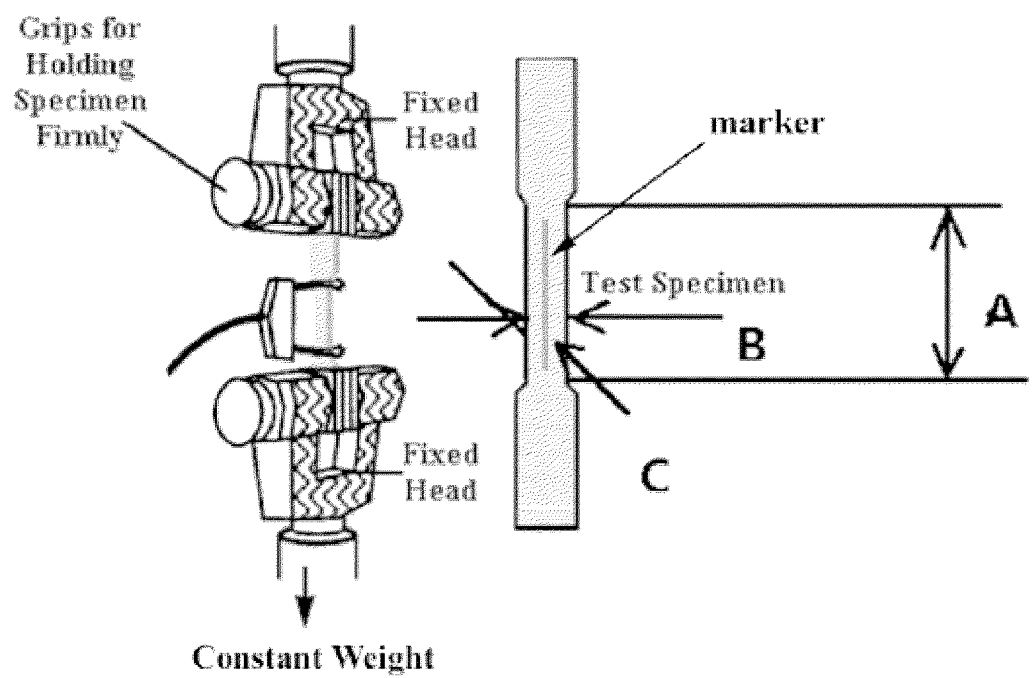
FIG. 5 is a schematic diagram of a heat resistance measuring device.

The width, the length, and a thickness of each binder sample are respectively indicated A, B, and C in FIG. 5. As illustrated in FIG. 5, a marker having a length of 2 cm is put on a central portion of the sample.

The sample under a load of 50 g was set in a drier at 150° C. as illustrated in FIG. 5 and maintained for 10 minutes.

Then, elongation of the marker was measured to evaluate heat resistance. Elongation was calculated using Equations 2 and 3 below.

Elongation=[(increased length of marker−initial length of marker)/initial length of marker]×100     Equation 2

The results of heat resistance evaluation are shown in Table 1 below.

TABLE 1

|  | Immersion breaking strength [Kg/cm$^2$] | Elongation [%] |
| --- | --- | --- |
| Example 1 | 84 | 5 |
| Example 2 | 102 | 4.1 |
| Example 3 | 126 | 3.2 |
| Example 4 | 62 | 6.2 |
| Example 5 | 76 | 5.5 |
| Example 6 | 82 | 4 |
| Example 7 | 106 | 3.6 |
| Example 8 | 98 | 4.2 |
| Example 9 | 102 | 7 |
| Comparative Example 1 | 35 | 20 |
| Comparative Example 2 | — | — |
| Comparative Example 3 | 25 | 26 |
| Example 10 | 84 | 5 |

According to Comparative Example 2, a binder film was not prepared since the amount of the nanoparticles is too high.

As shown in Table 1, the binder films prepared by using the binder compositions according to Examples 1 to 9 have greater breaking strength after being immersed in the electrolytic solution compared to the binder films prepared according to Comparative Examples 1 and 3. Accordingly, when applied to separators, the binder films according to Examples 1 to 9 may provide improved strength, thereby efficiently inhibiting shrinking of the separators.

In addition, as shown in Table 1, the binder films according to Examples 1 to 9 have reduced elongation compared to the binder films according to Comparative Examples 1 and 3. As a result, it was confirmed that heat resistance of the binder films according to Examples 1 to 9 was improved.

Since the separator prepared using the binder composition according to Example 10 has the same composition ratio as that of the separator of Example 2, except that the filler was not added thereto, the binder film has excellent breaking strength after being immersed in the electrolytic solution and high heat resistance. However, the separator according to Example 10 has high shrinkage as shown in Table 2.

Evaluation Example 3: Evaluation of Shrinkage of Separator

The separators having a thickness of 22 μm prepared according to Examples 1 to 10 and Comparative Examples 1 to 3 were receptively maintained in a convection oven at a temperature of about 130° C. and about 150° C. for 10 minutes, taken out of the convection oven, and cooled at room temperature. Then, thermal shrinkages of the resultants were measured.

A linear marker having a length of 10 cm was put on each separator in a longer axial direction of the separator, and the separator was maintained in an oven for a predetermined time period, taken out of the oven, and cooled at room temperature. Then, the degree of shrinking of the separator was evaluated by calculating the shrinkage of the separator by using Equation 3.

Shrinkage=[(initial length of marker−decreased length of marker)/initial length of marker]×100      Equation 3

Thermal shrinkages are shown in Table 2 below.

TABLE 2

|  | Shrinkage (130° C.) [%] | Shrinkage (150° C.) [%] |
| --- | --- | --- |
| Example 1 | 2 | 17 |
| Example 2 | 1.8 | 13 |
| Example 3 | 1.5 | 9 |
| Example 4 | 2.3 | 21 |
| Example 5 | 2.1 | 15 |
| Example 6 | 1.8 | 11 |
| Example 7 | 1.7 | 11 |
| Example 8 | 1.8 | 12 |
| Example 9 | 2.6 | 28 |
| Comparative Example 1 | 5 | 54 |
| Comparative Example 2 | — | — |
| Comparative Example 3 | 6 | 60 |
| Example 10 | 5 | 42 |

According to Comparative Example 2, a binder film was not prepared since the amount of the nanoparticles is too high.

In addition, as shown in Table 2, the separators according to Examples 1 to 9 have lower shrinkage compared to the separators according to Comparative Examples 1 and 3. In particular, the shrinkage was considerably reduced at 150° C.

As described above, according to the one or more of the above embodiments, the separator may have improved heat resistance and reduced thermal shrinkage by forming the coating layer including the binder composition.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present embodiments as defined by the following claims.

What is claimed is:

1. A separator comprising:
    a porous base material layer; and
    a coating layer disposed on at least one surface of the porous base material layer,
    wherein the coating layer comprises a filler and a binder composition,
    wherein the binder composition comprises:
        first polymer nanoparticles having an average particle diameter of about 90 nm or less, wherein the glass transition temperature of the first polymer nanoparticles is about 60° C. or higher; and
        a first polymer binder having a glass transition temperature of about 20° C. or less,
    wherein, within the binder composition, the first polymer nanoparticles are in an amount of about 7 to about 60 parts by weight based on 100 parts by weight of the first polymer binder.
2. The separator of claim 1, wherein an elongation of a binder film comprising the binder composition measured after maintaining the binder film under a load of 50 g at 150° C. for 10 minutes is about 10% or less.
3. The separator of claim 1, wherein a breaking strength of the binder film comprising the binder composition measured after being immersed in an electrolytic solution is about 40 Kg/cm$^2$ or greater.
4. The separator of claim 1, wherein the binder composition has a storage modulus of about 30 MPa or greater at 100° C.
5. The separator of claim 1, wherein the polymer particles are polyurethane.
6. The separator of claim 1, wherein the first polymer binder has a gel content of about 90% or less.
7. The separator of claim 1, wherein the binder composition further comprises a binding agent to chemically bind the first nanoparticles with the first polymer binder.
8. The separator of claim 1, wherein the filler has an average particle diameter of about 300 nm to about 2.0 µm.
9. The separator of claim 1, wherein an amount of the filter is about 50% by weight to about 99% by weight based on the total weight of the coating layer.
10. The separator of claim 1, wherein the porous base material layer comprises polyolefin.
11. The separator of claim 1, wherein the first polymer binder comprises a diene-based polymer prepared by polymerizing a monomer composition comprising diene-based monomers.
12. The separator of claim 11, wherein the diene-based monomers comprise 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinyl norbornene, dicyclopentadiene, and 1,4-hexadiene.
13. The separator of claim 1, having a shrinkage of about 40% or less after being maintained at 150° C. for 10 minutes.
14. The separator of claim 1, further comprising an adhesive layer disposed on the coating layer.
15. The separator of claim 14, wherein the adhesive layer comprises: the same binder as that of the coating layer; a binder different from that of the coating layer and comprising an acrylate-based binder, a fluorinated binder, a rubber binder or any combination thereof; a binder comprising inorganic particles, organic particles, or any combination thereof, and an organic polymer; or any combination thereof.
16. The separator of claim 15, wherein the organic particles have a particle diameter of about 1 nm to about 100 nm.
17. A lithium battery comprising the separator of claim 1.

* * * * *